US008428136B2

(12) United States Patent
Chono

(10) Patent No.: US 8,428,136 B2
(45) Date of Patent: Apr. 23, 2013

(54) DYNAMIC IMAGE ENCODING METHOD AND DEVICE AND PROGRAM USING THE SAME

(75) Inventor: Keiichi Chono, Tokyo (JP)

(73) Assignee: Nec Corporation, Tokyo (JP)

( * ) Notice: Subject to any disclaimer, the term of this patent is extended or adjusted under 35 U.S.C. 154(b) by 1078 days.

(21) Appl. No.: 12/282,217

(22) PCT Filed: Mar. 8, 2007

(86) PCT No.: PCT/JP2007/054541
§ 371 (c)(1),
(2), (4) Date: Dec. 8, 2008

(87) PCT Pub. No.: WO2007/105590
PCT Pub. Date: Sep. 20, 2007

(65) Prior Publication Data
US 2009/0310682 A1    Dec. 17, 2009

(30) Foreign Application Priority Data

Mar. 9, 2006 (JP) ................................ 2006-064079

(51) Int. Cl.
*H04N 7/12* (2006.01)
*H04N 11/02* (2006.01)
*H04N 11/04* (2006.01)

(52) U.S. Cl.
USPC .................................................. 375/240.16

(58) Field of Classification Search .............. 375/240.16
See application file for complete search history.

(56) References Cited

U.S. PATENT DOCUMENTS

| 5,159,443 A * | 10/1992 | Ando ............................ 358/500 |
| 2005/0180504 A1* | 8/2005 | Yamada et al. .......... 375/240.12 |
| 2006/0039476 A1* | 2/2006 | Watanabe ................ 375/240.16 |
| 2007/0019737 A1* | 1/2007 | Koto et al. ............... 375/240.16 |

FOREIGN PATENT DOCUMENTS

| EP | 1753247 A1 * | 2/2007 |
| JP | 8-126012 A | 5/1996 |
| JP | 2000-333180 A | 11/2000 |
| JP | 2001-251627 A | 9/2001 |
| JP | 2006-500796 A | 1/2008 |
| WO | 03/086315 A1 | 3/2003 |
| WO | 2004/049721 A1 | 6/2004 |
| WO | 2005/120077 A1 | 12/2005 |

OTHER PUBLICATIONS

Lai, C. et., al. "Adaptive Intra Mode Skipping Algorithm for Inter Frame Coding of H.264/AVC", Visual Communications and Image Processing, Jul. 12, 2005.

(Continued)

*Primary Examiner* — Eleni Shiferaw
*Assistant Examiner* — Jing Sims
(74) *Attorney, Agent, or Firm* — Sughrue Mion, PLLC

(57) ABSTRACT

A dynamic image encoding technique provides high image quality encoding while eliminating the formation of a subjectively undesirable vector field. A dynamic image encoding device includes: an inter-frame predictor, a motion vector calculator, a prediction motion vector calculator, a skip mode motion vector calculator, and a skip mode validity judger. The skip mode validity judger calculates a code amount of a differential motion vector of the motion vector estimated by considering the motion vector of the skip mode and the subjective image quality, and uses a value of the code amount of the differential motion vector weighted by a block quantization parameter for the skip mode validity judgment.

15 Claims, 20 Drawing Sheets

OTHER PUBLICATIONS

Kei-Ichi Chono and Yoshihiro Miyamoto, An Enhanced Mode Decision to Surpres Coding Artifacts in H. 264 Encoding, FIT2006, Media and Information Research Laboratories, NEC Corporation.

Information technology—Coding of audio-visual objects—Part 10: Advanced Video Coding, International Standard, Oct. 1, 2004, Second Edition, ISO/IEC, Switzerland.

* cited by examiner

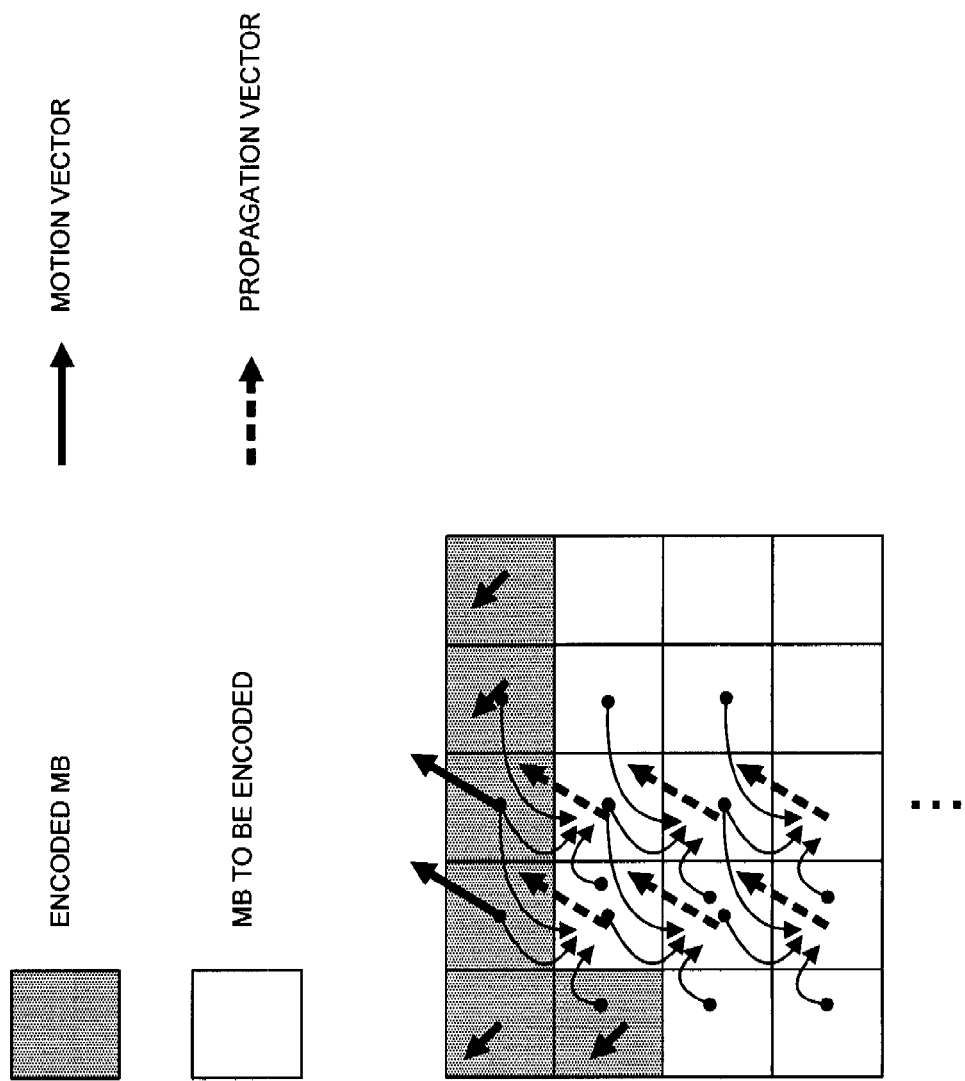

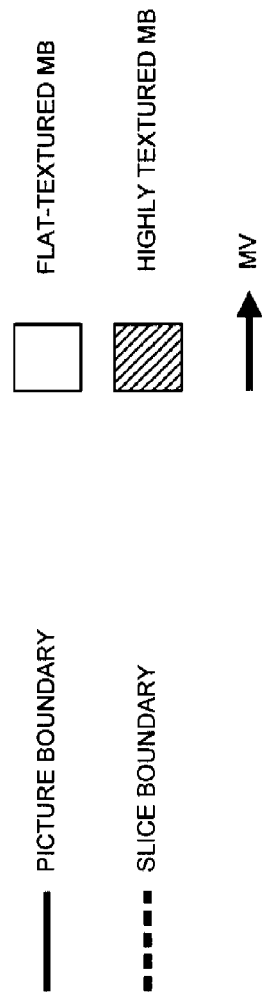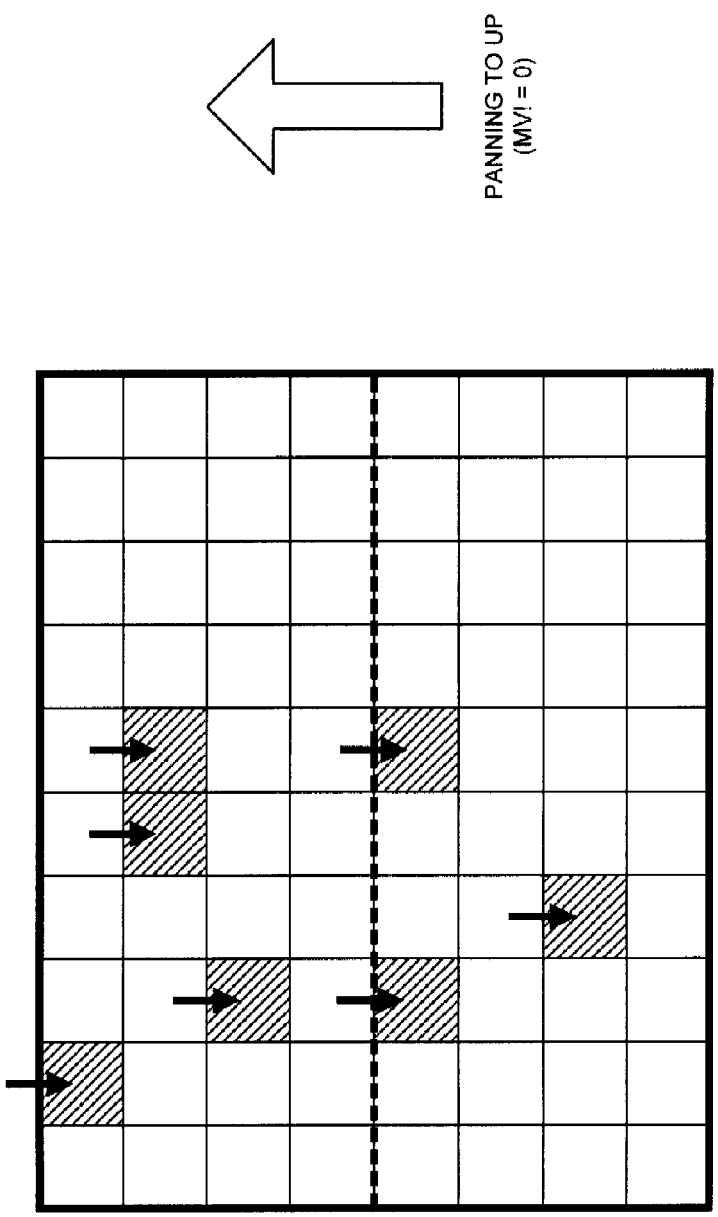

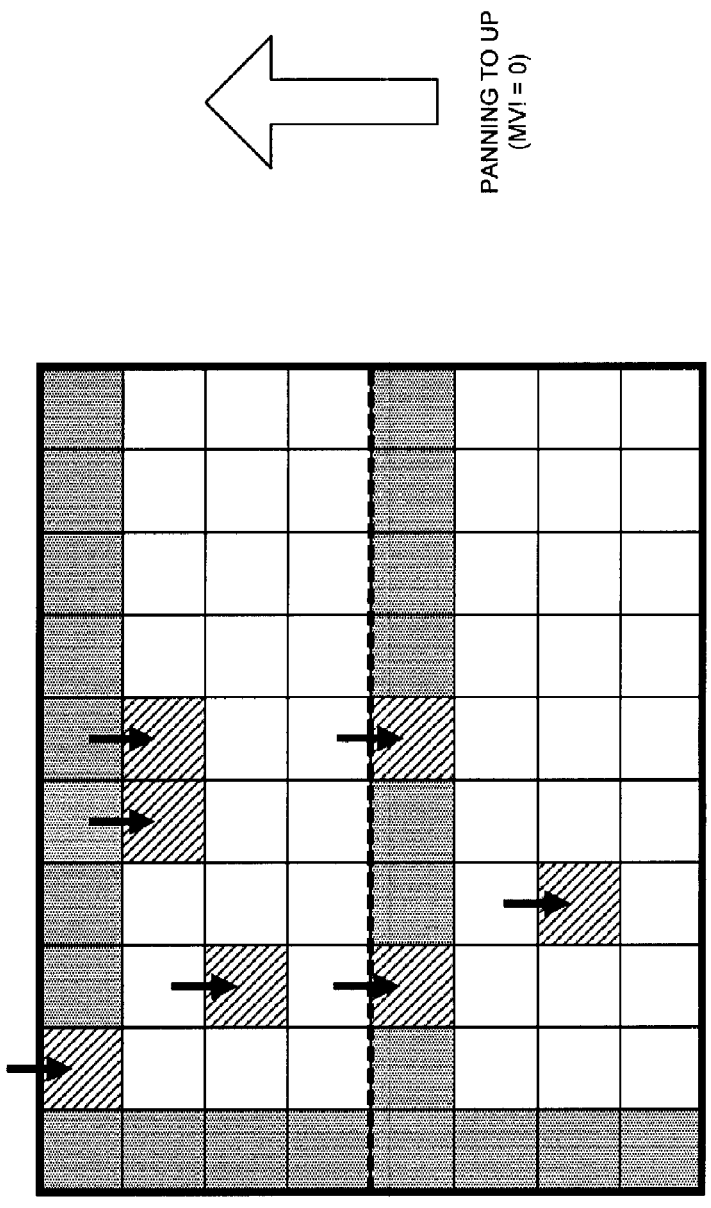
FIG. 6

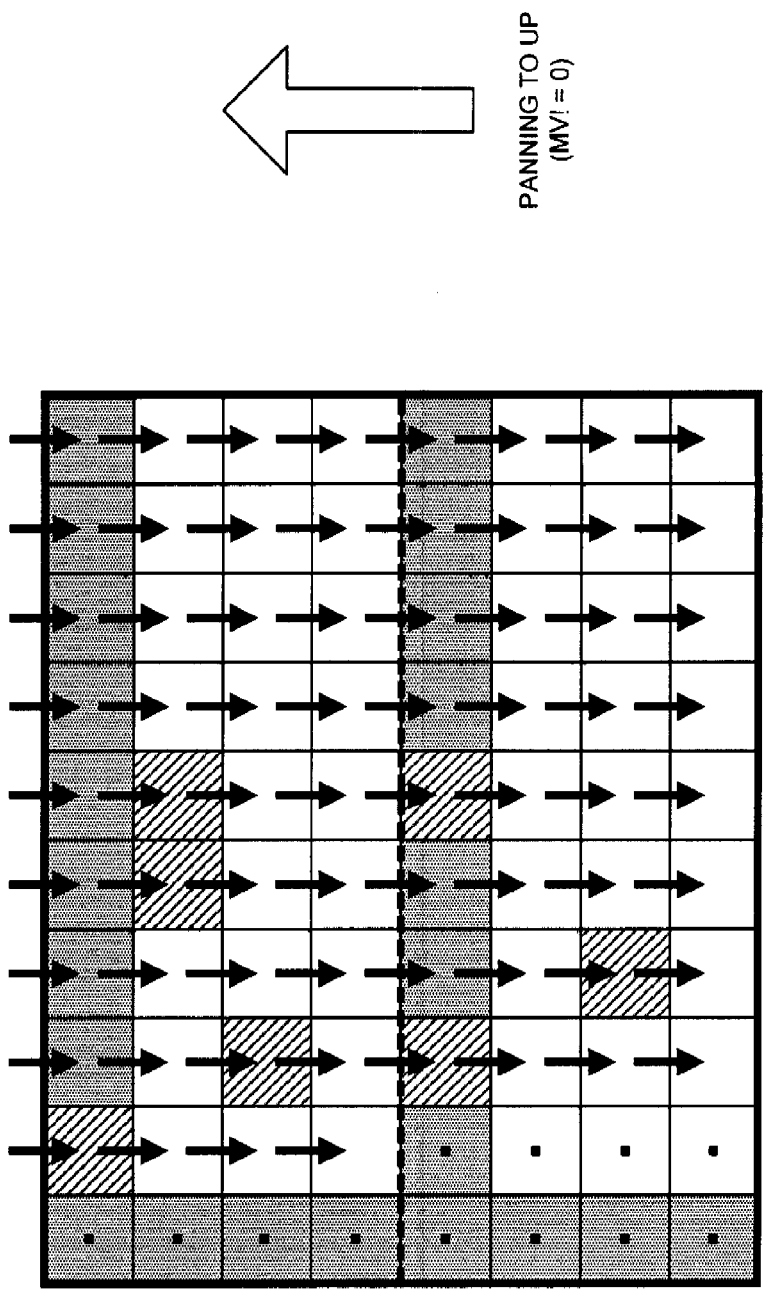
FIG. 12

DYNAMIC IMAGE ENCODING METHOD AND DEVICE AND PROGRAM USING THE SAME

TECHNICAL FIELD

The present invention relates to a method of deciding validity of a skip MB mode in a moving picture encoding technique using motion-compensated prediction, which invention is suitably applicable to a moving picture encoding apparatus and a program using this method.

BACKGROUND ART

One moving picture encoding scheme with a high compression rate is ISO/IEC 14496-10 Advanced Video Coding (Non-patent Document 1: ISO/IEC 14496-1.0 Advanced Video Coding), whose referential encoding scheme that is known is a Joint Model (JM) scheme. A moving picture encoding apparatus using the JM scheme will be referred to as a conventional moving picture encoding apparatus hereinbelow.

The conventional moving picture encoding apparatus applies encoding processing to Macro Blocks (MB's) one by one in each input image frame to generate encoded data, i.e., a bit stream. As used herein, an MB refers to a cell of an input image frame divided in a grid-like manner, containing 16×16 luminance pixels and 8×8 Cr-Cb chrominance pixels (FIG. 1). In a case that input data is interlaced, the structure of an image frame is divided into a first field and a second field, and each field serves as an image frame subjected to encoding processing.

Referring to FIG. 2, a conventional moving picture encoding apparatus for applying encoding processing to MB's is comprised of an MB buffer E101, a conversion apparatus E102, a quantization apparatus E103, an entropy coding apparatus E104, an inverse quantization/inverse conversion apparatus E105, a frame buffer E106, a prediction apparatus E107, a code-amount control apparatus E108, a motion vector calculating apparatus E109, and an MB mode deciding apparatus E110.

The MB buffer E101 stores therein an original image for an MB to be encoded.

According to AVC, a prediction method that provides satisfactory encoding of an MB to be encoded is selected for encoding from among a plurality of types of prediction methods. The prediction methods are generally classified into two types: intra-frame prediction and inter-frame prediction. Intra-frame prediction generates a predicted value from a reconstructed image of an image frame currently being encoded.

On the other hand, inter-frame prediction uses for prediction a reconstructed image of any one of a plurality of image frames encoded in the past.

Moreover, in inter-frame prediction according to AVC, a reconstructed image frame (reference frame) for use in inter-frame prediction is designated by an index ref_idx (reference index), and a position of a reconstructed image in the designated reconstructed image frame, which position serves as a source of a predicted value to be generated, is designated by a motion vector mv.

In addition, in inter-frame prediction according to AVC, by designating a type of inter-frame prediction (by selecting an MB mode mb_mode corresponding to the type of inter-frame prediction), it is possible to define a reference index ref_idx and a motion vector mv for a unitary block, which is a sub-division of an MB, for transmission (see Non-patent Document 1: ISO/IEC 14496-10 Advanced Video Coding for further information).

In general, a set of MB's (a slice) encoded only by intra-frame prediction is referred to as an I-slice, and a slice encoded by applying inter-frame prediction in addition to intra-frame prediction as a P-slice. Moreover, in inter-frame prediction, a slice including an MB that can be predicted using a combined image made up with a plurality of image frames is referred to as a B-slice. An image frame composed of I-slices solely is referred to as an I-picture, an image frame containing I-slices or P-slices (excluding B-slices) is referred to as a P-picture, and an image frame containing B-slices is referred to as a B-picture.

The motion vector calculating apparatus E109 looks up the original image stored in the MB buffer E101 and a reconstructed image stored in the frame buffer E106, and detects parameters (candidate reference index candidate_ref_idx and candidate motion vector candidate_mv) associated with the aforementioned plurality of types of prediction methods.

The MB mode deciding apparatus E110 uses the candidate reference index candidate_ref_idx and candidate motion vector candidate_mv detected by the motion vector calculating apparatus E109 to select a suitable one of the types of prediction for encoding an MB to be encoded (MB mode mb_mode). The selected MB mode mb_mode, and its corresponding reference index ref_idx and motion vector mv are entropy-encoded by the entropy coding apparatus E104.

The prediction apparatus E107 generates a predicted value corresponding to the MB mode mb_mode selected by the MB mode deciding apparatus E110, its corresponding reference index ref_idx and motion vector mv, from the reconstructed image stored in the frame buffer E106.

From the original image stored in the MB buffer E101 is subtracted the predicted value supplied by the prediction apparatus E107, and the result is supplied as a predictive error to the conversion apparatus E102.

The predictive error is converted into a value in the frequency domain by the conversion apparatus E102. The predictive error converted into the frequency domain is quantized by the quantization apparatus E103 with a quantization step size corresponding to a quantization parameter QP supplied by the code-amount control apparatus E108. The quantization parameter QP and quantized predictive error (quantization level) are entropy-encoded at the entropy coding apparatus E104 (Note that according to AVC, the quantization parameter can be defined on an MB-by-MB basis).

The above-described quantization level is subjected to inverse quantization and inverse conversion by the inverse quantization/inverse conversion apparatus E105, and brought back to its original spatial domain. The predictive error brought back to the spatial domain is added with the predicted value supplied by the prediction apparatus E107, and the result is stored in the frame buffer E106 as a reconstructed image for subsequent encoding.

The conventional moving picture encoding apparatus performs encoding processing by applying the aforementioned processing to each MB in each input image frame.

DISCLOSURE OF THE INVENTION

Problems to be Solved by the Invention

Among the aforementioned motion-compensated prediction modes for an MB, there is a skip mode in which a reference index and a motion vector are generated from an already-encoded block to allow calculation of a predicted value for an image using the generated reference index and motion vector (Since AVC allows the skip mode to be specified on an MB-by-MB basis, the mode will be sometimes referred to as a skip MB mode hereinbelow). The skip MB mode is an MB mode in which the need for entropy-encoding of the reference index, motion vector, and quantization level for transmission is eliminated. Especially, for P-slices, a skip MB mode in which the condition of spatially adjacent already-encoded blocks (context) is used to generate a reference index skip_ref_idx and a motion vector skip_mv for a skip MB is generally referred to as a P skip MB mode.

The P skip MB mode eliminates the need for entropy-encoding of the reference index, motion vector, and quantization level for transmission. Thus, the P skip MB mode tends to be selected as an MB mode suitable for encoding in a region that is flat and is likely to have a smaller predictive error.

However, in a case that the P skip MB mode is selected in a region having a flat scene as in panning and the P skip MB mode has a motion vector inconsistent with the motion of panning, there arises a problem that a subjectively undesirable vector field is generated.

A cause of the problem lies in median prediction for a motion vector, and a rule of generation of the reference index and motion vector for the P skip MB mode. The median prediction for a motion vector, and rule of generation of the reference index and motion vector for the P skip MB mode according to AVC, which constitute the cause, will be described hereinbelow (see Non-patent Document 1: ISO/IEC 14496-10 Advanced Video Coding for further information).

In median prediction for a motion vector, motion vectors of three blocks adjacent to a block to be processed are looked up, and a motion vector having a median value among them is defined as a predicted motion vector (pmv). The three blocks adjacent to the block to be processed are a left adjacent block (block A), an upper adjacent block (block B), and an upper-right or upper-left adjacent block (block C or block D). Median prediction for a motion vector for a 16×16 block size (MB) corresponding to a reference index ref_idx will now be described with reference to FIG. 3. Note that the predicted motion vector is used in predictive encoding of a motion vector.

Computational steps for a predicted motion vector p16mv will be provided below in the form of pseudo program codes, wherein MEDIAN (a, b, c) designates a function that returns a median value of input a, b, c, p16mv designates a predicted motion vector of an MB with respect to a reference index ref_idx, ref_idx_X designates a reference index of an adjacent block X, mv_X designates a motion vector of the adjacent block X, and avail_flag_X designates an availability flag of the adjacent block X. The availability flag avail_flag_X of the adjacent block X is defined to have a value of False when the block X lies outside a picture or belongs to another slice. Otherwise, avail_flag_X is defined to have a value of True.

```
if(avail_flag_A == True)
{
    ref_idx_l = ref_idx_A;
    mv_l = mv_A;
}
else
{
    ref_idx_l = -1;
    mv_l = 0;
}
```

-continued

```
if(avail_flag_B == True)
{
    ref_idx_u = ref_idx_B;
    mv_u = mv_B;
}
else
{
    ref_idx_u = -1;
    mv_u = 0;
}
if(avail_flag_C == True)
{
    ref_idx_di = ref_idx_C;
    mv_di = mv_C;
}
else if(avail_flag_D == True)
{
    ref_idx_di = ref_idx_D;
    mv_di = mv_D;
}
else
{
    ref_idx_di = -1;
    mv_di = 0;
}
if(ref_idx_l == ref_idx && ref_idx_u != ref_idx && ref_idx_di ! = ref_idx)
p16mv = mv_l;
else if(ref_idx_l != ref_idx && ref_idx_u == 0 && ref_idx_di != ref_idx)
p16mv = mv_u;
else if(ref_idx_l != ref_idx && ref_idx_u != ref_idx && ref_idx_di == ref_idx)
p16mv = mv_di;
else if(avail_flag_B == False && avail_flag_C == False)
p16mv = mv_l;
else
p16mv = MEDIAN(mv_l, mv_u, mv_di);
```

Because of the nature of median prediction, when the motion vectors for two or more adjacent blocks are the same, a predicted motion vector for a block to be processed also becomes the same as that for the two or more adjacent blocks. Moreover, a region that is flat and has a small predictive error tends to avoid transmission of a differential vector for the current MB. From these reasons, when MB's having the same motion vector appear consecutively in the horizontal direction in the region that is flat and is likely to have a smaller predictive error, as in FIG. 4, the motion vectors for the consecutively appearing MB's tend to spread (propagate) in a lower direction of the picture plane.

Next, a rule of generation of the reference index and motion vector for the P skip MB mode according to AVC will be explained.

In the P skip MB mode according to AVC, a reference index skip_ref_idx is defined as zero. On the other hand, a motion vector skip_mv is defined as zero vector when a zero vector is present in an adjacent block (having a value of zero for the motion vector in its horizontal and vertical components), or when the MB to be encoded lies at the boundary of pictures or of slices (with the proviso that it lies on the left or upper edge), which is regarded as having no significant motion.

Otherwise, significant motion (including global motion and local motion) is assumed and the motion vector skip_mv v is defined as a predicted motion vector p16mv as described above corresponding to the reference index ref_idx=0. In particular, the motion vector skip_mv becomes a zero vector when the context of its adjacent blocks (the availability flag, reference index, and motion vector of blocks A and B) meets any one of the conditions given below; otherwise, it becomes the predicted motion vector p16mv corresponding to the reference index
ref_idx=0.
avail_flag_A==False
avail_flag_B==False
avail_flag_A==True && ref_idx_A==0 && mv_A==0
avail_flag_B==True && ref_idx_B==0 && mv_B==0

According to the rule of generation of a motion vector for the P skip MB mode, when the P skip MB mode appears with the condition that ref_idx=0 and mv=0, a motion vector for a subsequent MB in the P skip MB mode unconditionally becomes a zero vector. Specifically, in a flat region in which the P skip MB mode is likely to be selected, the P skip MB mode with a zero vector consecutively appears, and a motion vector of zero vector propagates in a rightward and downward direction of the picture plane. Especially, the motion vector for the P skip MB mode is always a zero vector at the boundary of pictures or of slices, which is looked up in prediction of the motion vector, and therefore, an effect of the motion vector on the vector field in the picture plane is significant.

Now description will be made hereinbelow on an example in which a subjectively undesirable vector field is unfavorably generated in a region having a flat scene as in panning due to the median prediction of a motion vector, and the rule of generation of the reference index and motion vector for the P skip MB mode according to AVC as explained above.

Referring to FIG. 5, assume that a frame to be encoded is vertically panned, most of the image region is flat (with flat-textured MB's), and a motion vector that matches panning is obtained by motion vector calculation only from MB's with texture (highly textured MB's).

In such a case, since a predictive error for a flat MB is small even when the motion vector for use in inter-frame prediction slightly varies, a P skip MB mode is likely to be selected. In an MB lying at the boundary of pictures or of slices, a motion vector skip_mv for the skip MB mode is a zero vector according to the aforementioned rule of generation for the P skip MB mode (see FIG. 6 at MB with SkipMV=0), Thus, in an flat image region following the slice boundary, in spite of the fact that the whole image is vertically panned, encoding is completed with the result that most of the flat MB's have a motion vector of zero vector due to the median prediction and propagation of the motion vector according to the P skip MB mode (FIG. 7). As a result, motion of panning is significantly different from motion in the encoded image, thus resulting in generation of a subjectively undesirable vector field.

The present invention has been made in view of such a problem, and its object is to provide a moving picture encoding method, and an apparatus and a computer program using the same, with which generation of a subjectively undesirable vector field is avoided, enabling encoding with high image quality.

Means for Solving the Problems

A first invention for solving the aforementioned problem is a moving picture encoding method, characterized in that the method includes: an inter-frame prediction step of applying inter-frame prediction to an image on a block-by-block basis; a motion vector calculating step of calculating a reference frame and a motion vector for use in inter-frame prediction of the above-described block; a predicted motion vector calculating step of calculating a predicted motion vector for prediction encoding of a motion vector of the above-described block; a skip mode motion vector calculating step of calculating a skip mode motion vector for a skip mode using a context of blocks spatially adjacent to the above-described block; and a skip mode validity deciding step of deciding whether the skip mode is valid as an encoding mode for the above-described block, wherein the above-described skip mode validity deciding step uses the above-described skip mode motion vector for the skip mode validity decision.

A second invention for solving the aforementioned problem is, in the aforementioned first invention, characterized in that the above-described skip mode validity deciding step uses for the skip mode validity decision a value obtained by weighting, with a quantization parameter of the above-described block, a code-amount of a differential motion vector between the above-described skip mode motion vector and the above-described predicted motion vector corresponding to a reference frame for the above-described skip mode.

A third invention for solving the aforementioned problem is, in the aforementioned second invention, characterized in that the above-described skip mode validity deciding step decides that the skip mode is invalid as an encoding mode for the above-described block in a case that the reference frame for the above-described skip mode is different from a reference frame calculated at the above-described motion vector calculating step.

A fourth invention for solving the aforementioned problem is, in the aforementioned second invention, characterized in that the above-described skip mode motion vector calculating step defines the skip mode motion vector as zero vector in a case that the above-described block lies at a boundary of pictures or of slices, and the above-described skip mode validity deciding step decides that the skip mode is invalid in a block lying at a boundary of pictures or of slices.

A fifth invention for solving the aforementioned problem is, in the aforementioned first invention, characterized in that the above-described skip mode validity deciding step uses for the skip mode validity decision a value obtained by weighting, with a quantization parameter of the above-described block, a code-amount of a differential motion vector between the above-described skip mode motion vector and the motion vector calculated at the above-described motion vector calculating step corresponding to a reference frame for the above-described skip mode.

A sixth invention for solving the aforementioned problem is, in the aforementioned fifth invention, characterized in that the above-described skip mode validity deciding step decides that the skip mode is invalid as an encoding mode for the above-described block in a case that the reference frame for the above-described skip mode is different from a reference frame calculated at the above-described motion vector calculating step.

A seventh invention for solving the aforementioned problem is, in the aforementioned fifth invention, characterized in that the above-described skip mode motion vector calculating step defines the skip mode motion vector as zero vector in a case that the above-described block lies at a boundary of pictures or of slices, and the above-described skip mode validity deciding step decides that the skip mode is invalid in a block lying at a boundary of pictures or of slices.

An eighth invention for solving the aforementioned problem is a moving picture encoding apparatus, characterized in that the apparatus includes: inter-frame prediction means for applying inter-frame prediction to an image on a block-by-block basis; motion vector calculating means for calculating a reference frame and a motion vector for use in inter-frame prediction of the above-described block; predicted motion vector calculating means for calculating a predicted motion vector for prediction encoding of a motion vector of the above-described block; skip mode motion vector calculating means for calculating a skip mode motion vector for a skip mode using a context of blocks spatially adjacent to the above-described block; and skip mode validity deciding means for deciding whether the skip mode is valid as an encoding mode for the above-described block, wherein the above-described skip mode validity deciding means uses the above-described skip mode motion vector for the skip mode validity decision.

A ninth invention for solving the aforementioned problem is, in the aforementioned eighth invention, characterized in that the above-described skip mode validity deciding means uses for the skip mode validity decision a value obtained by weighting, with a quantization parameter of the above-described block, a code-amount of a differential motion vector between the above-described skip mode motion vector and the above-described predicted motion vector corresponding to a reference frame for the above-described skip mode.

A tenth invention for solving the aforementioned problem is, in the aforementioned ninth invention, characterized in that the above-described skip mode validity deciding means decides that the skip mode is invalid as an encoding mode for the above-described block in a case that the reference frame for the above-described skip mode is different from a reference frame calculated by the above-described motion vector calculating means.

An eleventh invention for solving the aforementioned problem is, in the aforementioned ninth invention, characterized in that the above-described skip mode motion vector calculating means defines the skip mode motion vector as zero vector in a case that the above-described block lies at a boundary of pictures or of slices, and the above-described skip mode validity deciding means decides that the skip mode is invalid in a block lying at a boundary of pictures or of slices.

A twelfth invention for solving the aforementioned problem is, in the aforementioned eighth invention, characterized in that the above-described skip mode validity deciding means uses for the skip mode validity decision a value obtained by weighting, with a quantization parameter of the above-described block, a code-amount of a differential motion vector between the above-described skip mode motion vector and the motion vector calculated by the above-described motion vector calculating means corresponding to a reference frame for the above-described skip mode.

A thirteenth invention for solving the aforementioned problem is, in the aforementioned twelfth invention, characterized in that the above-described skip mode validity deciding means decides that the skip mode is invalid as an encoding mode for the above-described block in a case that the reference frame for the above-described skip mode is different from a reference frame calculated by the above-described motion vector calculating means.

A fourteenth invention for solving the aforementioned problem is, in the aforementioned twelfth invention, characterized in that the above-described skip mode motion vector calculating means defines the skip mode motion vector as zero vector in a case that the above-described block lies at a boundary of pictures or of slices, and the above-described skip mode validity deciding means decides that the skip mode is invalid in a block lying at a boundary of pictures or of slices.

A fifteenth invention for solving the aforementioned problem is a program for a moving picture encoding apparatus, characterized in that the above-described program causes the above-described moving picture encoding apparatus to function as: inter-frame prediction means for applying inter-frame prediction to an image on a block-by-block basis; motion vector calculating means for calculating a reference frame and a motion vector for use in inter-frame prediction of the above-described block; predicted motion vector calculating means for calculating a predicted motion vector for prediction encoding of a motion vector of the above-described block; skip mode motion vector calculating means for calculating a skip mode motion vector for a skip mode using a context of blocks spatially adjacent to the above-described block; and skip mode validity deciding means for deciding whether the skip mode is valid as an encoding mode for the above-described block, and causes the above-described skip mode validity deciding means to function to use the above-described skip mode motion vector for the skip mode validity decision.

A sixteenth invention for solving the aforementioned problem is, in the aforementioned fifteenth invention, characterized in that the program causes the above-described skip mode validity deciding means to function to use for the skip mode validity decision a value obtained by weighting, with a quantization parameter of the above-described block, a code-amount of a differential motion vector between the above-described skip mode motion vector and the above-described predicted motion vector corresponding to a reference frame for the above-described skip mode.

A seventeenth invention for solving the aforementioned problem is, in the aforementioned sixteenth invention, characterized in that the above-described skip mode validity deciding means decides that the skip mode is invalid as an encoding mode for the above-described block in a case that the reference frame for the above-described skip mode is different from a reference frame calculated by the above-described motion vector calculating means.

An eighteenth invention for solving the aforementioned problem is, in the aforementioned sixteenth invention, characterized in that the above-described skip mode motion vector calculating means defines the skip mode motion vector as zero vector in a case that the above-described block lies at a boundary of pictures or of slices, and the above-described skip mode validity deciding means decides that the skip mode is invalid in a block lying at a boundary of pictures or of slices.

A nineteenth invention for solving the aforementioned problem is, in the aforementioned fifteenth invention, characterized in that the program causes the above-described skip mode validity deciding means to function to use for the skip mode validity decision a value obtained by weighting, with a quantization parameter of the above-described block, a code-amount of a differential motion vector between the above-described skip mode motion vector and the motion vector calculated by the above-described motion vector calculating means corresponding to a reference frame for the above-described skip mode.

A twentieth invention for solving the aforementioned problem is, in the aforementioned nineteenth invention, characterized in that the above-described skip mode validity deciding means decides that the skip mode is invalid as an encoding mode for the above-described block in a case that the reference frame for the above-described skip mode is different from a reference frame calculated by the above-described motion vector calculating means.

The twenty-first invention for solving the aforementioned problem is, in the aforementioned nineteenth invention, characterized in that the above-described skip mode motion vector calculating means defines the skip mode motion vector as zero vector in a case that the above-described block lies at a boundary of pictures or of slices, and the above-described skip mode validity deciding means decides that the skip mode is invalid in a block lying at a boundary of pictures or of slices.

Effects of the Invention

According to the present invention, there are provided a moving picture encoding method, and an apparatus and a computer program using the same, with which generation of a subjectively undesirable vector field is avoided, enabling encoding with high image quality.

BRIEF DESCRIPTION OF THE DRAWINGS

FIG. 4 is a diagram for explaining propagation of a predicted motion vector in a flat region.

FIG. 5 shows an example of an image frame to be encoded (in vertical panning).

FIG. 6 shows a P skip MB being a zero vector at the picture boundary and slice boundary.

FIG. 12 shows generation of a desirable vector field.

EXPLANATION OF SYMBOLS

E11000 Hypothetical vector cost calculation
E11001 Motion-compensated prediction
E11002 SATD calculation
E11003 Skip MB motion vector calculation
E11004 Predicted motion vector calculation
E11005 Vector cost calculation
E11006 Decision

BEST MODES FOR CARRYING OUT THE INVENTION

Figure 2:
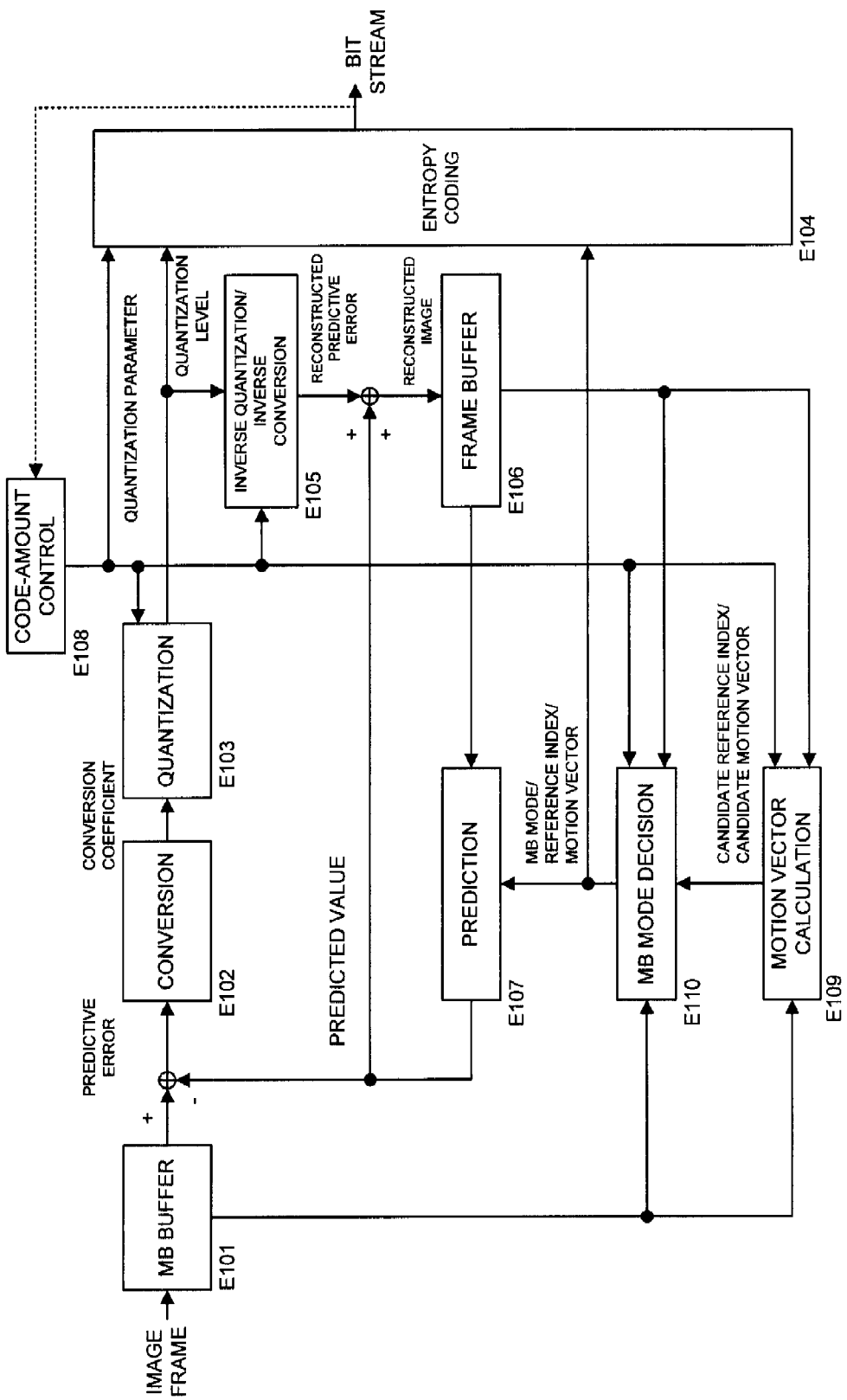
FIG. 2 is a block diagram of a conventional moving picture encoding apparatus.
Figure 3:
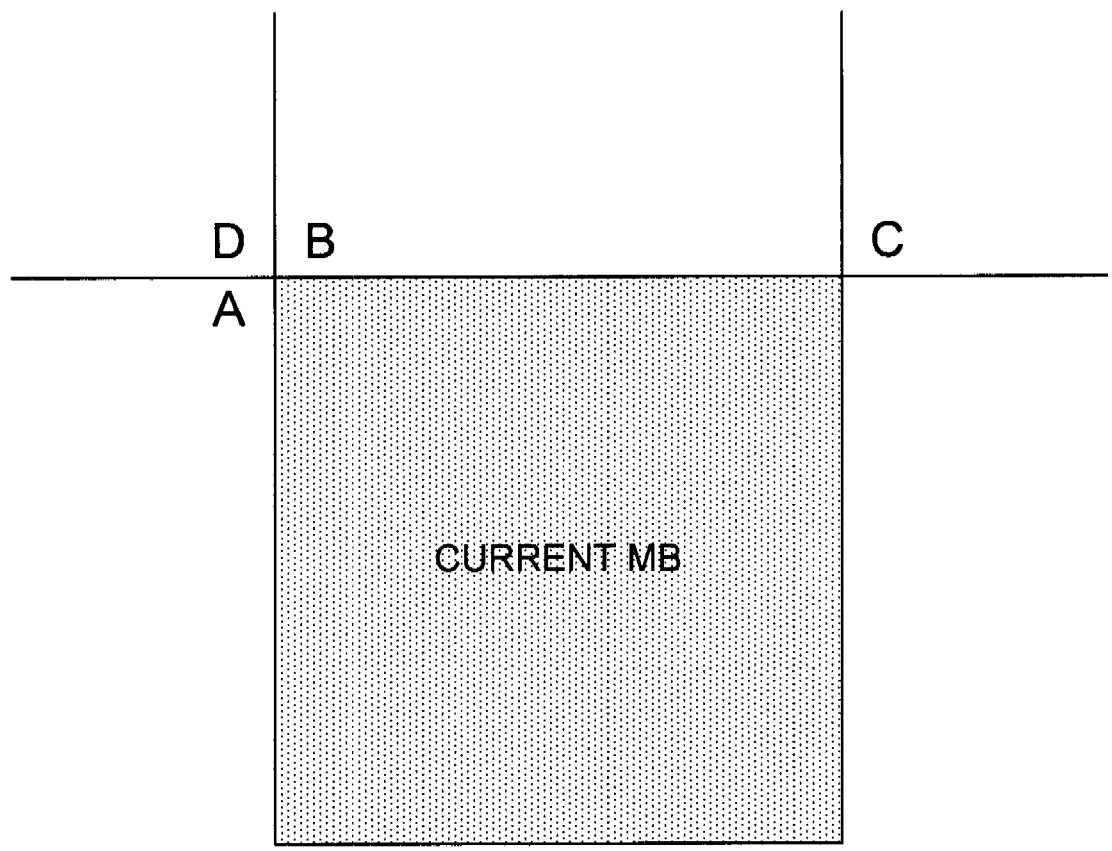
FIG. 3 is a diagram for explaining the relationship between an MB to be encoded and reference blocks adjacent thereto.
Figure 7:
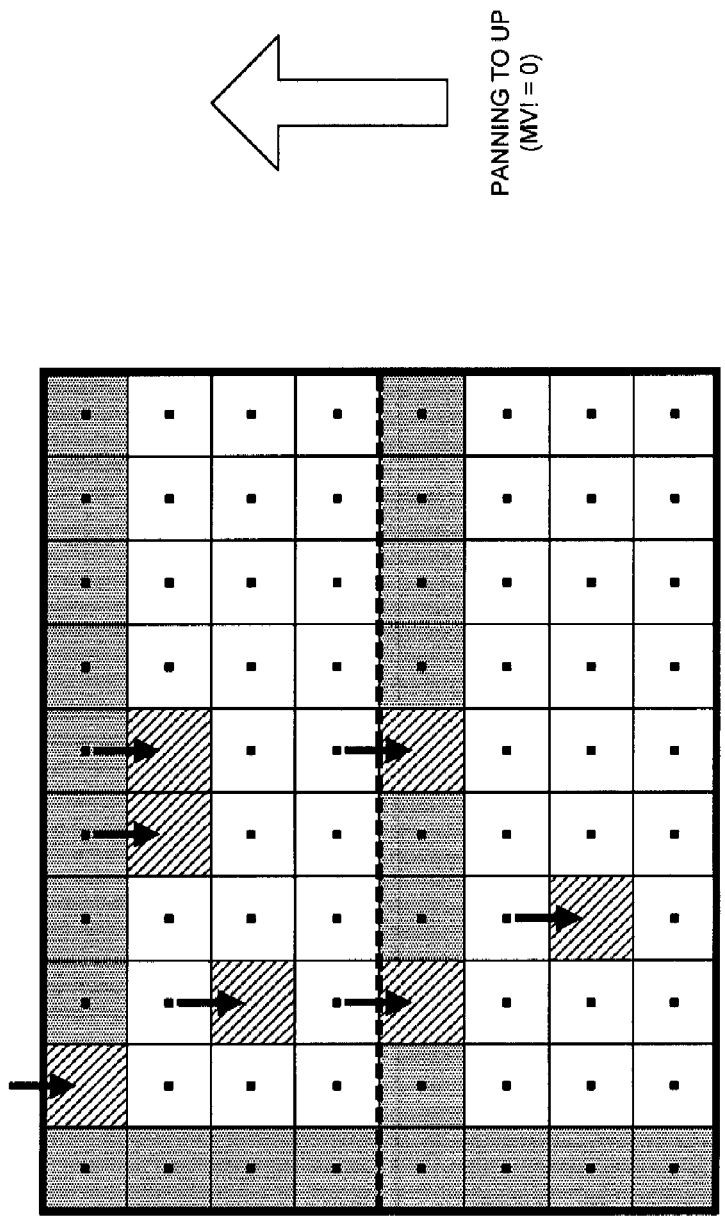
FIG. 7 shows generation of a subjectively undesirable vector field.

The present invention relates only to a validity decision technique for a skip MB mode in a moving picture encoding technique using motion-compensated prediction. Hence, in a moving picture encoding apparatus using the present invention, only the configuration and operation of the MB mode deciding apparatus E110 are different from those in the whole conventional apparatus in FIG. 2. In the following description, the MB mode deciding apparatus E110 in the conventional scheme will be addressed in detail, and thereafter, several embodiments of the present invention will be explained.

<Conventional Scheme>

Figure 8:
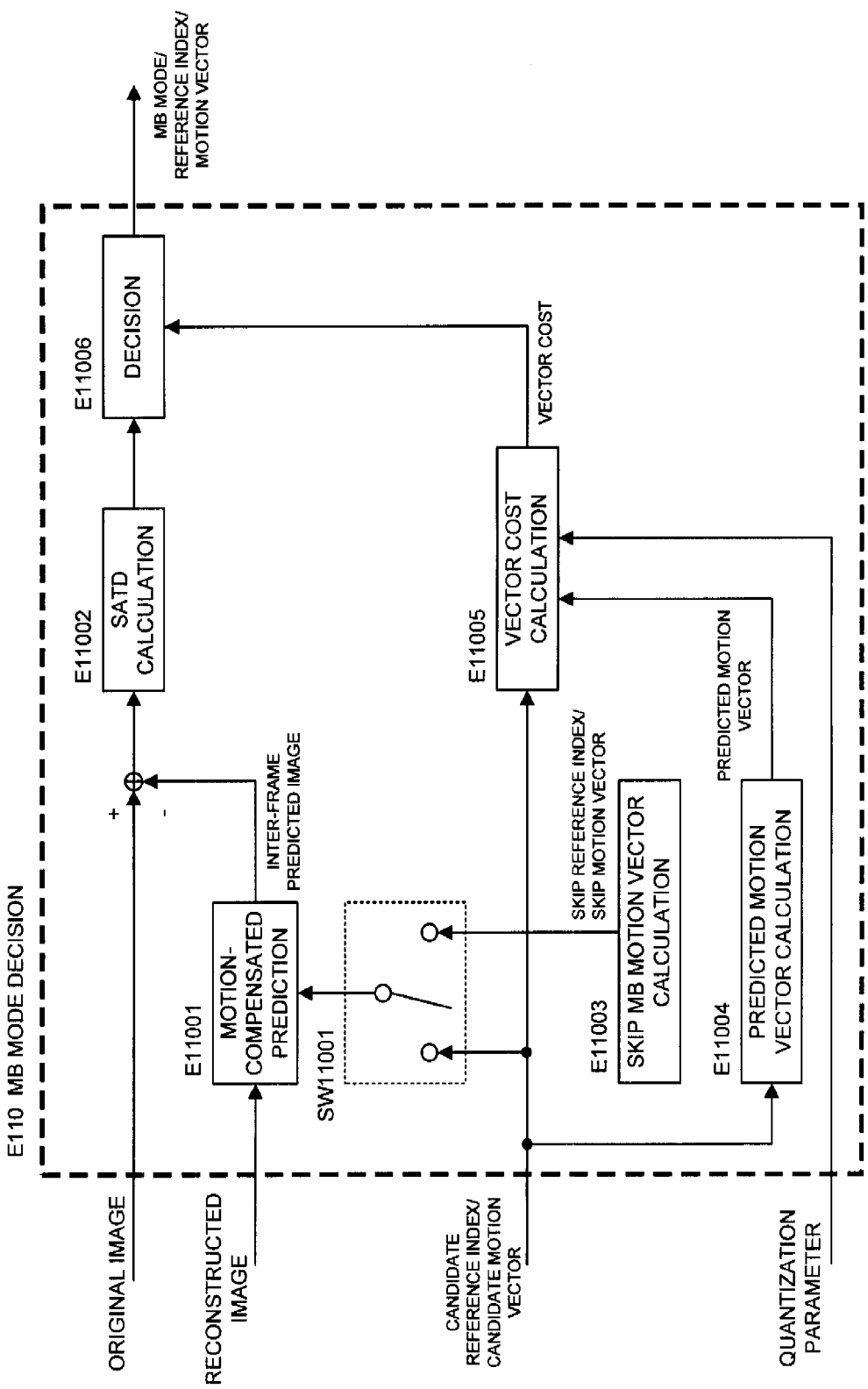
FIG. 8 shows a conventional MB mode deciding apparatus.

Referring to FIG. 8, the conventional MB mode deciding apparatus is comprised of a motion-compensated prediction apparatus E11001, an SATD calculating apparatus E11002, a skip MB motion vector calculating apparatus E11003, a predicted motion vector calculating apparatus E11004, a vector cost calculating apparatus E11005, a deciding apparatus E11006, and a switch SW11001.

Figure 9:
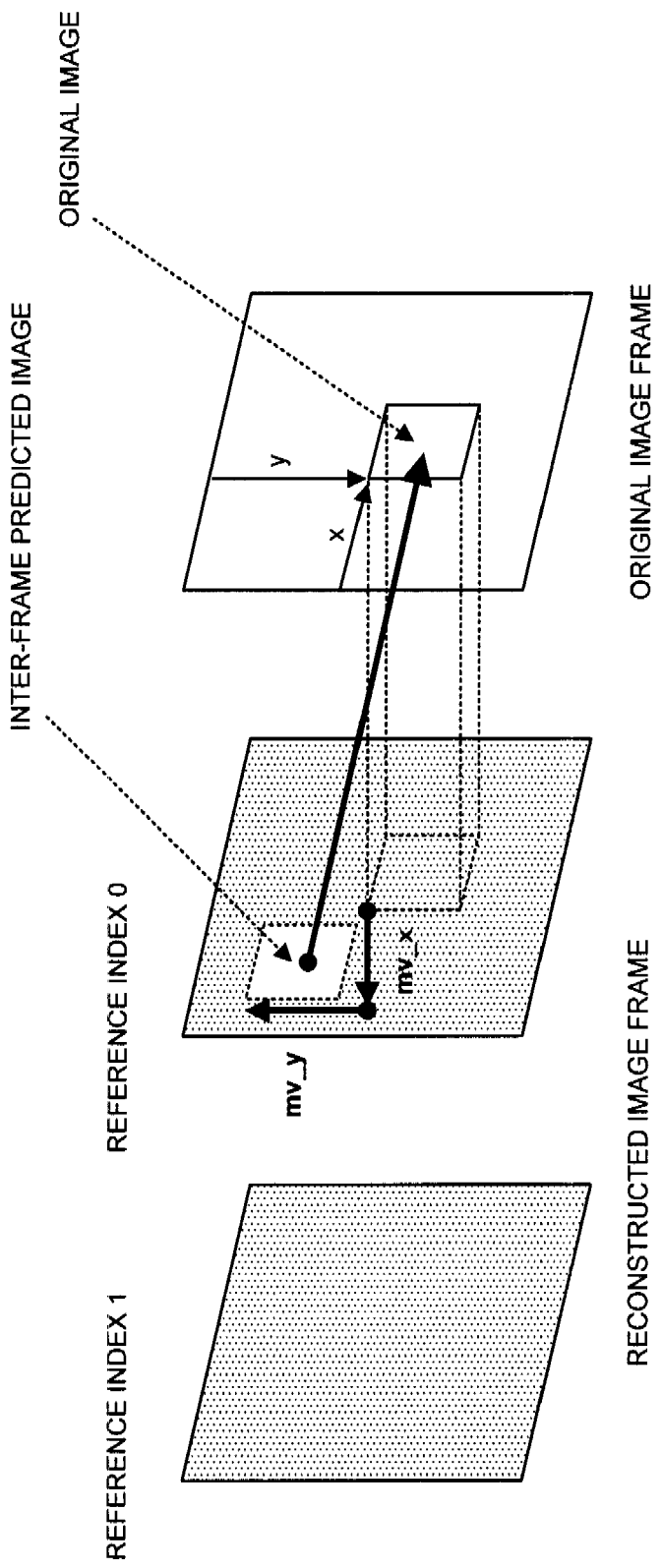
FIG. 9 is a diagram for explaining generation of an inter-frame predicted image.

The motion-compensated prediction apparatus E11001 generates an inter-frame predicted image corresponding to input reference index and motion vector with switching at the switch SW11001 between a candidate reference index candidate_ref_idx and a candidate motion vector candidate_mv (candidate_mv_x, candidate_mv_y) supplied by the external motion vector calculating apparatus E109, and a reference index skip_ref_idx and a motion vector skip_mv (skip_mv_x, skip_mv_y) for a skip MB supplied by the skip MB motion vector calculating apparatus E11003. FIG. 9 shows an example of an inter-frame predicted image with ref_idx=0.

For convenience in the following explanation, the aforementioned inter-frame predicted image pred is defined as a formula given by:

$$pred = MC(ref\_idx, mv\_x, mv\_y) \quad (1)$$

where $MC(ref\_idx, mv\_x, mv\_y)$ is a function for calculating, according to the supplied reference index ref_idx and motion vector (mv_x, mv_y), an inter-frame predicted image from a reconstructed image frame at the reference index ref_idx using coordinates (x,y) at an upper left corner and the motion vector (mv_x, mv_y) of a block to be prediction-processed. Note that according to AVC, pixel precision for a motion vector mv is ¼-pixel precision.

The SATD calculating apparatus E11002 calculates an SATD according to EQ. (2) below, using a predictive error pe obtained by subtracting the inter-frame predicted image pred supplied by the motion-compensated prediction apparatus E11001 from the original image org:

$$SATD(idx) = 0.5 \times \sum_{x=0}^{3} \sum_{y=0}^{3} |H(idx)_{xy}| \quad (2)$$

$$H(idx) = T4 \otimes PE(idx) \otimes T4^t \quad (3)$$

$$T4 = \begin{bmatrix} 1 & 1 & 1 & 1 \\ 1 & 1 & -1 & -1 \\ 1 & -1 & -1 & 1 \\ 1 & -1 & 1 & -1 \end{bmatrix} \quad (4)$$

$$pe(idx)_{ij} = org(b4x_{idx} + i, b4y_{idx} + j) - \\ pred(b4x_{idx} + i, b4y_{idx} + j) \quad (5)$$

Figure 1:
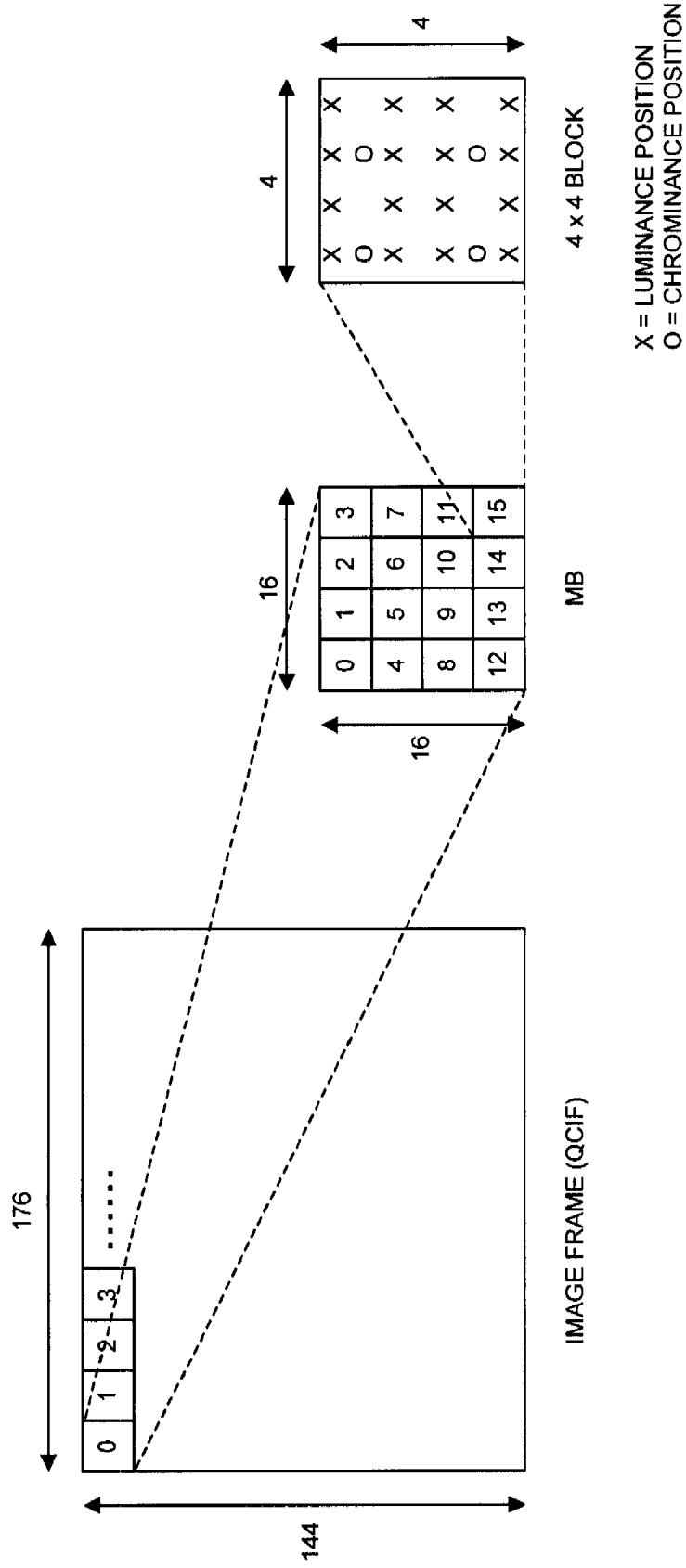
FIG. 1 shows a configuration of an image frame (in a 4:2:0 format).

In the equations, idx designates an index of a 4×4 block within an MB as shown in FIG. 1, and $$(b4x_{idx}, b4y_{idx})\{0 \leq b4x_{idx} \leq 12, 0 \leq b4y_{idx} < 12\}$$

represents coordinates at an upper left corner of the 4×4 block corresponding to idx within the MB. While the aforementioned calculation of SATD is achieved by using Hadamard transform with a block size of 4×4, Hadamard transform with a block size of 8×8 may be alternatively employed, or SAD (Sum of Absolute Differences) may be employed in place of SATD.

The skip MB motion vector calculating apparatus E11003 calculates a reference index skip_ref_idx and a motion vector skip_mv (skip_mv_x, skip_mv_y) corresponding to a skip MB, details of which follow the description in the section of PROBLEMS TO BE SOLVED BY THE INVENTION.

The predicted motion vector calculating apparatus E11004 calculates a predicted motion vector pmv (pmv_x, pmv_y)

corresponding to the candidate reference index candidate_ref_idx, details of which follow the description in the section of PROBLEMS TO BE SOLVED BY THE INVENTION.

The vector cost calculating apparatus E11005 subtracts the predicted motion vector pmv (pmv_x, pmv_y) supplied by the predicted motion vector calculating apparatus E11004 from the candidate motion vector candidate_mv (candidate_mv_x, candidate_mv_y) to determine a differential motion vector dmv (dmv_x, dmv_y), and a code-amount dmv_bit of the differential motion vector dmv. The code-amount dmv_bit is defined as a formula given by:

$$dmv\_bit = Bit\_length(dmv\_x) + Bit\_length(dmv\_y) \quad (6)$$

Here, Bit_length(x) is a function that returns the number of bits in entropy encoding of a differential motion vector x.

Moreover, the vector cost calculating apparatus E11005 applies a weight using a quantization parameter QP supplied by the external code-amount control apparatus E108 to the aforementioned code-amount dmv_bit according to EQ. (7) below, and supplies the result of weighting to the deciding apparatus E11006 as a vector cost mv_cost.

$$mv\_cost = 2^{(QP-12)/6} \times dmv\_bit \quad (7)$$

The deciding apparatus E11006 calculates a cost mb_cost for an MB mode other than the skip MB mode using the SATD supplied by the SATD calculating apparatus E11002 and the vector cost mv_cost supplied by the vector cost calculating apparatus E11005 corresponding to the candidate reference index candidate_ref_idx and candidate motion vector candidate_mv, according to EQ. (8) below:

$$mb\_cost = \sum_{idx=0}^{15} SATD(idx) + mv\_cost \quad (8)$$

In contrast, the need for entropy-encoding of the motion vector for transmission is eliminated in the skip MB mode. Hence, the deciding apparatus E11006 calculates a cost smb_cost for the skip MB mode using only the SATD supplied by the SATD calculating apparatus E11002 corresponding to the reference index skip_ref_idx and motion vector skip_mv for a skip MB, according to EQ. (9) below:

$$smb\_cost = \sum_{idx=0}^{15} SATD(idx) \quad (9)$$

The deciding apparatus E11006 (validity deciding apparatus for a skip MB mode) decides that the skip MB is valid in a case that the cost smb_cost for the skip MB mode is smaller than the cost mb_cost for an MB mode other than the skip MB mode, and outputs mb_mode, a reference index ref_idx, and a motion vector mv corresponding to the skip MB mode to the external. Otherwise, it outputs mb_mode, a reference index ref_idx, and a motion vector mv corresponding to an MB mode other than the skip MB mode to the external.

As described earlier, since in a flat MB, the SATD value thereof is relatively small even when a motion vector (skip_mv) for the skip MB mode has a different value from the true motion vector, and moreover, the motion vector cost mv_cost is not needed, the skip MB mode is decided to be valid among other MB modes. In a region having a flat scene as in panning, the P skip MB mode having a motion vector inconsistent with motion of panning is selected, resulting in generation of a subjectively undesirable vector field.

The explanation of the conventional MB mode decision has now been completed.

In contrast with the conventional technique, the present invention employs a corrective value based on the motion vector for the skip MB mode to make validity decision of the skip MB mode. The corrective value is a hypothetical vector cost obtained by weighting, with a quantization parameter of the current block, a code-amount calculated from a differential motion vector between the motion vector for the skip MB mode and the estimated motion vector. In this way, generation of a subjectively undesirable vector field can be avoided. Now validity decision of the skip MB mode in accordance with the present invention will be explained below.

First Embodiment

As compared with the conventional scheme, a first embodiment includes means for determining a hypothetical vector cost from a code-amount of a differential motion vector between the motion vector for the skip MB mode and the predicted motion vector corresponding to a reference frame (reference index) for the skip MB mode. The hypothetical vector cost can be employed in validity decision for the skip MB mode to overcome the aforementioned problem.

A configuration of an MB mode deciding apparatus of the present embodiment will be explained below with reference to FIG. 10.

As compared with the conventional MB mode deciding apparatus in FIG. 8, it can be seen that a hypothetical vector cost calculating apparatus P10000 and a switch SW11002 are newly introduced. Moreover, a vector cost supplied by the vector cost calculating apparatus E11005 is supplied to the deciding apparatus E11006 via the switch SW11002. Thus, the operation of the deciding apparatus E11006 is different from that in the conventional scheme.

The following explanation will be made on the hypothetical vector cost calculating apparatus P10000 and deciding apparatus E11006, which constitute characteristic portions of the present invention.

The hypothetical vector cost calculating apparatus P10000 employs the quantization parameter QP supplied by the external code-amount control apparatus E108, motion vector skip_mv corresponding to the skip MB supplied by the skip MB motion vector calculating apparatus E11003, and predicted motion vector pmv16 of an MB corresponding to ref_idx=0 (reference index of the skip MB) supplied by the predicted motion vector calculating apparatus E11004, to calculate a hypothetical vector cost smv_cost, details of which follow the description in the section of PROBLEMS TO BE SOLVED BY THE INVENTION.

The hypothetical vector cost calculating apparatus P10000 subtracts the predicted motion vector pmv16 (pmv16_x, pmv16_y) supplied by the predicted motion vector calculating apparatus E11004 from the motion vector skip_mv (skip_mv_x, skip_mv_y) corresponding to the skip MB to determine a hypothetical differential motion vector sdmv (sdmv_x, dmv_y), and a hypothetical code-amount sdmv_bit of the differential motion vector sdmv. The hypothetical code-amount sdmv_bit is defined as given by EQ. (10) below:

$$sdmv\_bit = Bit\_length(sdmv\_x) + Bit\_length(sdmv\_y) \quad (10)$$

Moreover, the hypothetical vector cost calculating apparatus P10000 employs the aforementioned quantization parameter QP to weight the hypothetical code-amount sdmv_bit as given by EQ. (11), and supplies the result of the weighting to the switch SW11002 as the hypothetical vector cost smv_cost:

$$smv\_cost = 2^{(QP-12)/6} \times sdmv\_bit \quad (11)$$

The hypothetical vector cost smv_cost in EQ. (11) serves as an offset for preventing the skip MB mode from being selected to generate a subjectively undesirable vector field. In a case that a non-zero quantization level is generated in an MB for which the skip MB mode is decided to be valid, the reference index and motion vector are entropy-encoded assuming the inter-frame prediction mode of the 16×16 pixel size with a reference index ref_idx=0 and a motion vector mv=skip_mv; thus, it serves as the motion vector cost in this case.

In an MB mode other than the skip MB mode, the deciding apparatus E11006 of the present invention employs the SATD supplied by the SATD calculating apparatus E11002 corresponding to the candidate reference index candidate_ref_idx and candidate motion vector candidate_mv, and the vector cost mv_cost supplied by the vector cost calculating apparatus E11005 via the switch SW11002, to calculate a cost mb_cost for the MB mode according to EQ. (8), as in the conventional technique.

$$mb\_cost = \sum_{idx=0}^{15} SATD(idx) + mv\_cost \quad (8)$$

In contrast, in the skip MB mode, the deciding apparatus E11006 according to the present invention employs the SATD supplied by the SATD calculating apparatus E11002 corresponding to the reference index skip_ref_idx and motion vector skip_mv for the skip MB, and the hypothetical vector cost smv_cost supplied by the hypothetical vector cost calculating apparatus P10000 via the switch SW11002 to calculate a cost smb_cost for the skip MB mode as given by EQ. (12), unlike the conventional technique:

$$smb\_cost = \sum_{idx=0}^{15} SATD(idx) + smv\_cost \quad (12)$$

The deciding apparatus E11006 decides that the skip MB is valid if the cost smb_cost for the skip MB mode is smaller than the cost mb_cost for the MB mode other than the skip MB mode as in the conventional technique, and outputs the mb_mode, reference index ref_idx, and motion vector mv corresponding to the skip MB mode to the external. Otherwise, it outputs the mb_mode, reference index ref_idx, and motion vector mv corresponding to the MB mode other than the skip MB mode to the external.

Figure 11:
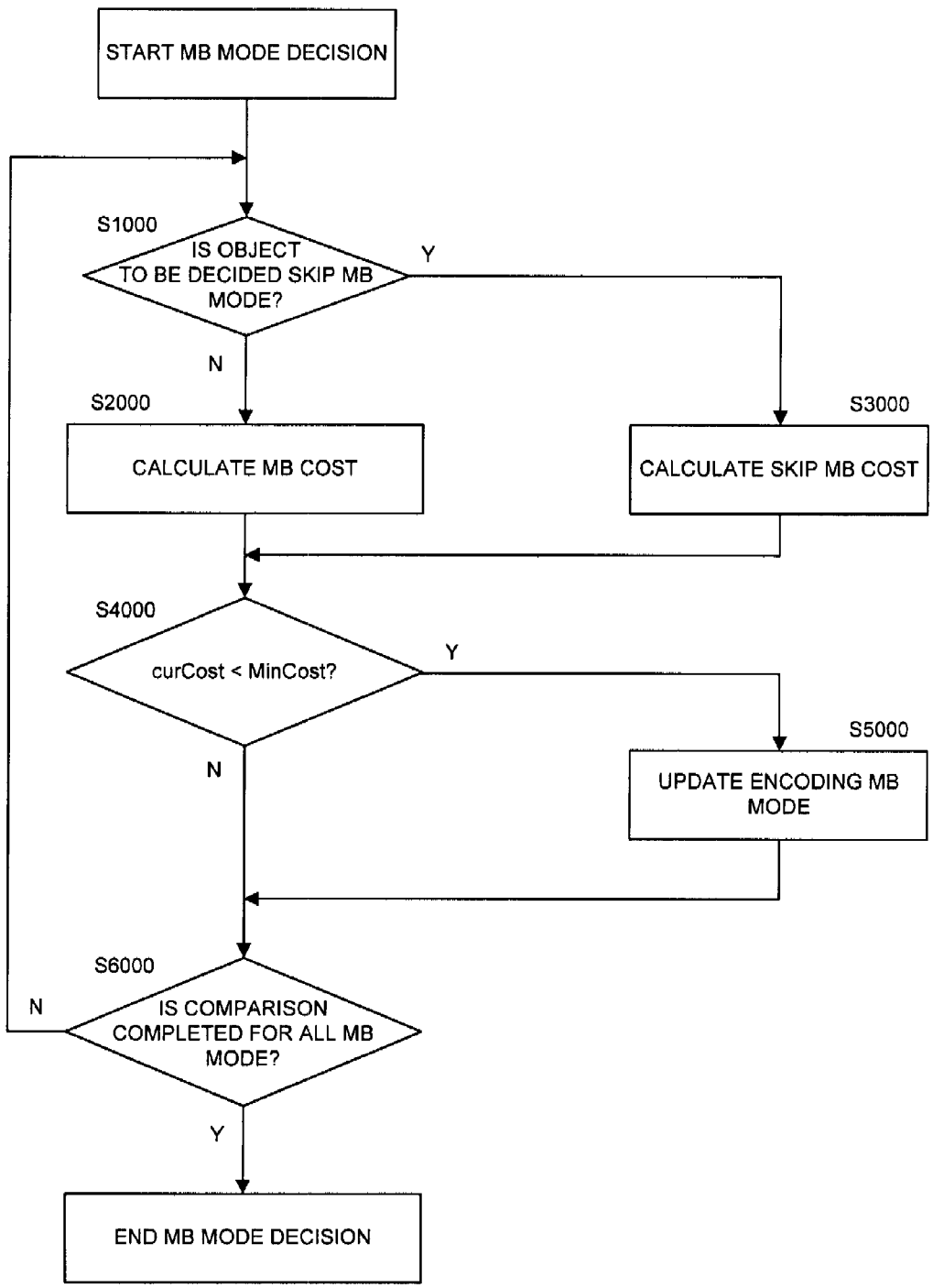
FIG. 11 is a flow chart in the first embodiment.

Subsequently, an operation of the MB mode deciding apparatus in accordance with the present embodiment will be explained with reference to FIG. 11.

At the start of MB mode decision, an initial value (a sufficiently large value) is first set into a minimum cost MinCost.

At Step S1000, a decision is made as to whether an object to be decided is the skip MB. If it is not the skip MB, the process goes to Step S2000; otherwise, to Step S3000.

At Step S2000, the reference index ref_idx and motion vector mv corresponding to the MB mode to be decided are employed to calculate an MB mode cost mb_cost according to EQ. (8), which is set into a variable curCost, and the process then goes to Step S4000.

At Step S3000, the reference index ref_idx and motion vector mv corresponding to the skip MB mode are employed to calculate a skip MB mode cost smb_cost according to EQ. (12), which is set into a variable curCost, and the process then goes to Step S4000.

At Step S4000, a decision is made as to whether the variable curCost is smaller than the minimum cost MinCost. If it is smaller, the process goes to Step S5000; otherwise, to Step S6000.

At Step S5000, the minimum cost MinCost is updated using the variable curCost, and mb_mode for the current MB mode to be decided, its corresponding reference index ref_idx and motion vector mv are stored (an encoding MB mode to be selected is updated). Then, the process goes to Step S6000.

At Step S6000, a decision is made as to whether comparison is completed for all MB modes. If comparison is not completed for all MB modes, mb_mode for a next MB mode to be decided is set and the process goes back to Step S1000. If comparison is completed for all MB modes, the MB mode decision is terminated.

Upon termination of the MB mode decision, the MB mode deciding apparatus outputs the currently held mb_mode, reference index ref_idx, and motion vector mv as parameters for encoding the current MB to the external.

The operation of the MB mode deciding apparatus according to the present embodiment has thus been completed.

By encoding moving picture using the MB mode deciding apparatus according to the present invention as described above, even when encoding is applied to an image that is vertical panned as shown in FIG. 5, and in which image most of the image region is flat (flat-textured MB) and the motion vector matching the panning is obtained by motion vector calculation only with MB's with texture (highly textured MB), a subjectively desirable vector field in which motion of panning matches motion in the encoded image as in FIG. 12 is generated by virtue of the effect of the hypothetical vector cost smv_cost.

Second Embodiment

As compared with the first embodiment, a second embodiment includes means for determining a hypothetical vector cost from the code-amount of a differential motion vector between the motion vector for the skip MB mode and the motion vector corresponding to the reference frame (reference index) for the skip MB mode calculated by the motion vector calculating apparatus.

Figure 13:
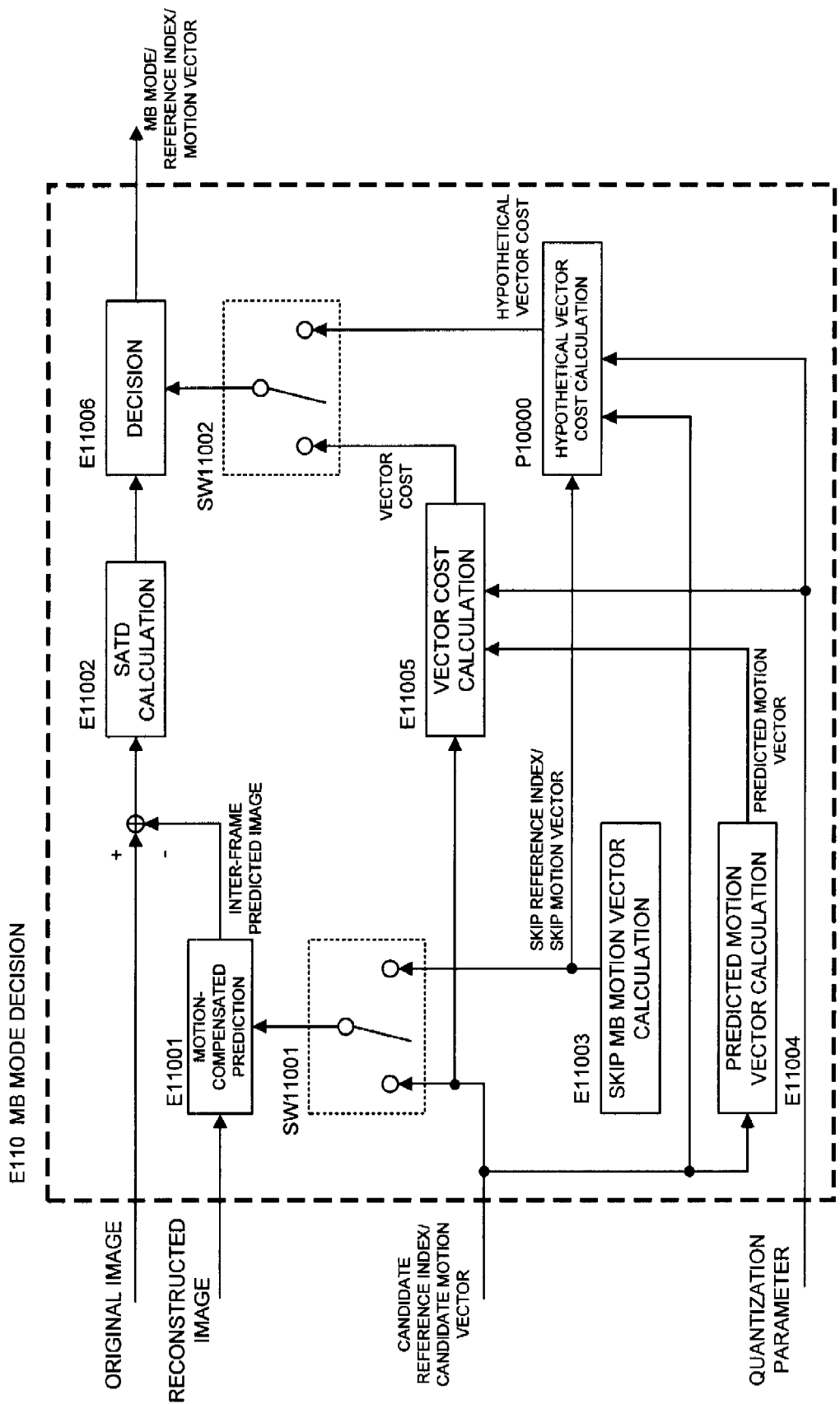
FIG. 13 is a block diagram of a second embodiment.

A configuration of an MB mode deciding apparatus of the present embodiment will be explained below with reference to FIG. 13.

Figure 10:
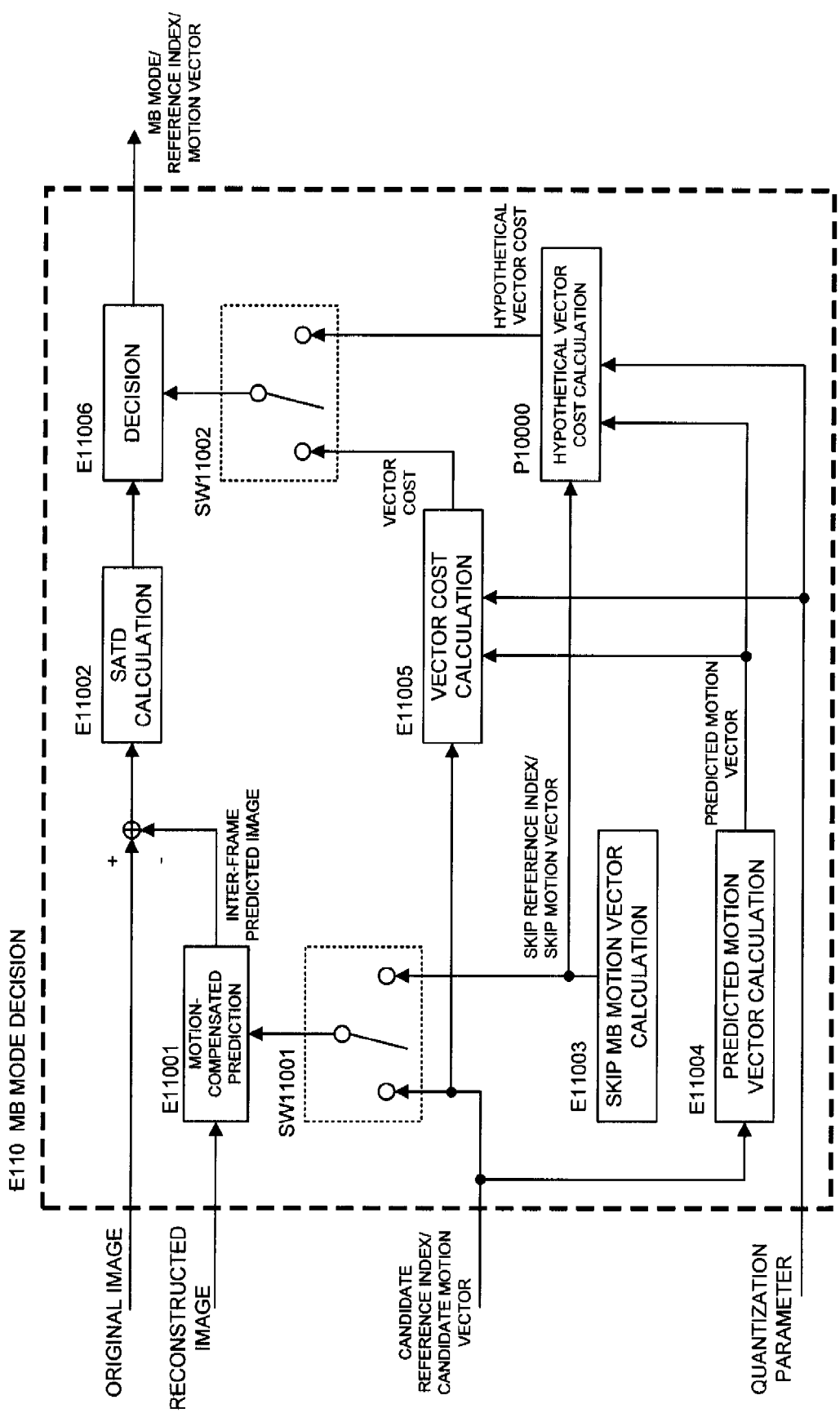
FIG. 10 is a block diagram showing a first embodiment.

As compared with the MB mode deciding apparatus of the first embodiment in FIG. 10, the apparatus of the present embodiment is different in that the candidate motion vector, instead of the predicted motion vector, is supplied to the hypothetical vector cost calculating apparatus P10000. Thus, the operation of the hypothetical vector cost calculating apparatus P10000 is different from that in the first embodiment.

The following explanation will be made on the hypothetical vector cost calculating apparatus P10000, which constitutes a characteristic portion of this embodiment.

The hypothetical vector cost calculating apparatus P10000 employs the quantization parameter QP supplied by the external code-amount control apparatus E108, motion vector skip_mv corresponding to the skip MB supplied by the skip MB motion vector calculating apparatus E11003, and candidate reference index ref_idx16 and candidate motion vector mv16 for the inter-frame prediction mode corresponding to the 16×16 block size supplied by the external motion vector calculating apparatus E109, to calculate a hypothetical vector cost smv_cost.

The hypothetical vector cost calculating apparatus P10000 subtracts the motion vector mv16 (pmv16_x, pmv16_y) supplied by the motion vector calculating apparatus E109 from the motion vector skip_mv (skip_mv_x, skip_mv_y) corresponding to the skip MB to determine a hypothetical differential motion vector pdmv (pdmv_x, pdmv_y), and a hypothetical code-amount pdmv_bit of the differential motion vector pdmv. The hypothetical code-amount pdmv_bit in the present embodiment is defined as given by EQ. (13) below:

$$pdmv\_bit = Bit\_length(pdmv\_x) + Bit\_length(pdmv\_y) \quad (13)$$

Moreover, the hypothetical vector cost calculating apparatus P10000 employs the aforementioned quantization parameter QP to weight the hypothetical code-amount pdmv_bit as given by EQ. (14), and supplies the result of the weighting to the switch SW11002 as the hypothetical vector cost pmv_cost:

$$pmv\_cost = 2^{(QP-12)/6} \times pdmv\_bit \quad (14)$$

The hypothetical vector cost pmv_cost in EQ. (14) serves as an offset for preventing the skip MB mode from being selected to generate a subjectively undesirable vector field, as with the hypothetical vector cost smv_cost in EQ. (12). Since the hypothetical vector cost is different from that in the first embodiment, a cost smb_cost for the skip MB mode calculated by the deciding apparatus E11006 is given as EQ. (15):

$$smb\_cost = \sum_{idx=0}^{15} SATD(idx) + pmv\_cost \quad (15)$$

The explanation of the hypothetical vector cost calculating apparatus P10000 in the present embodiment has now been completed.

As can be seen from the configuration, the operation flow of MB mode decision is identical in the first embodiment and the present embodiment. However, the processing at Step S3000 is different, and therefore, MB mode decision according to the present embodiment will be fully described below.

At the start of MB mode decision, an initial value (a sufficiently large value) is first set into a minimum cost MinCost.

At Step S1000, a decision is made as to whether an object to be decided is the skip MB. If it is not the skip MB, the process goes to Step S2000; otherwise, to Step S3000.

At Step S2000, the reference index ref_idx and motion vector mv corresponding to the MB mode to be decided are employed to calculate an MB mode cost mb_cost according to EQ. (8), which is set into a variable curCost, and the process then goes to Step S4000.

At Step S3000, the reference index ref_idx and motion vector mv corresponding to the skip MB mode are employed to calculate a skip MB mode cost smb_cost according to EQ. (15), which is set into a variable curCost, and the process then goes to Step S4000.

At Step S4000, a decision is made as to whether the variable curCost is smaller than the minimum cost MinCost. If it is smaller, the process goes to Step S5000; otherwise, to Step S6000.

At Step S5000, the minimum cost MinCost is updated using the variable curCost, and mb_mode for the current MB mode to be decided, its corresponding reference index ref_idx and motion vector mv are stored (an encoding MB mode to be selected is updated). Then, the process goes to Step S6000.

At Step S6000, a decision is made as to whether comparison is completed for all MB modes. If comparison is not completed for all MB modes, mb_mode for a next MB mode to be decided is set and the process goes back to Step S1000. If comparison is completed for all MB modes, the MB mode decision is terminated.

Upon termination of the MB mode decision, the MB mode deciding apparatus outputs the currently held mb_mode, reference index ref_idx, and motion vector mv as parameters for encoding the current MB to the external.

The explanation of the operation of the MB mode deciding apparatus according to the present embodiment has now been completed.

When encoding moving picture using the MB mode deciding apparatus according to this embodiment as described above, a subjectively desirable vector field in which motion of panning matches motion in the encoded image is generated by virtue of the effect of the hypothetical vector cost pmv_cost, as with the first embodiment. It will be easily recognized that this embodiment may be suitably applied to validity decision of a direct mode for B-slices (see Non-patent Document 1: ISO/IEC 14496-10 Advanced Video Coding for further information).

Third Embodiment

Figure 14:
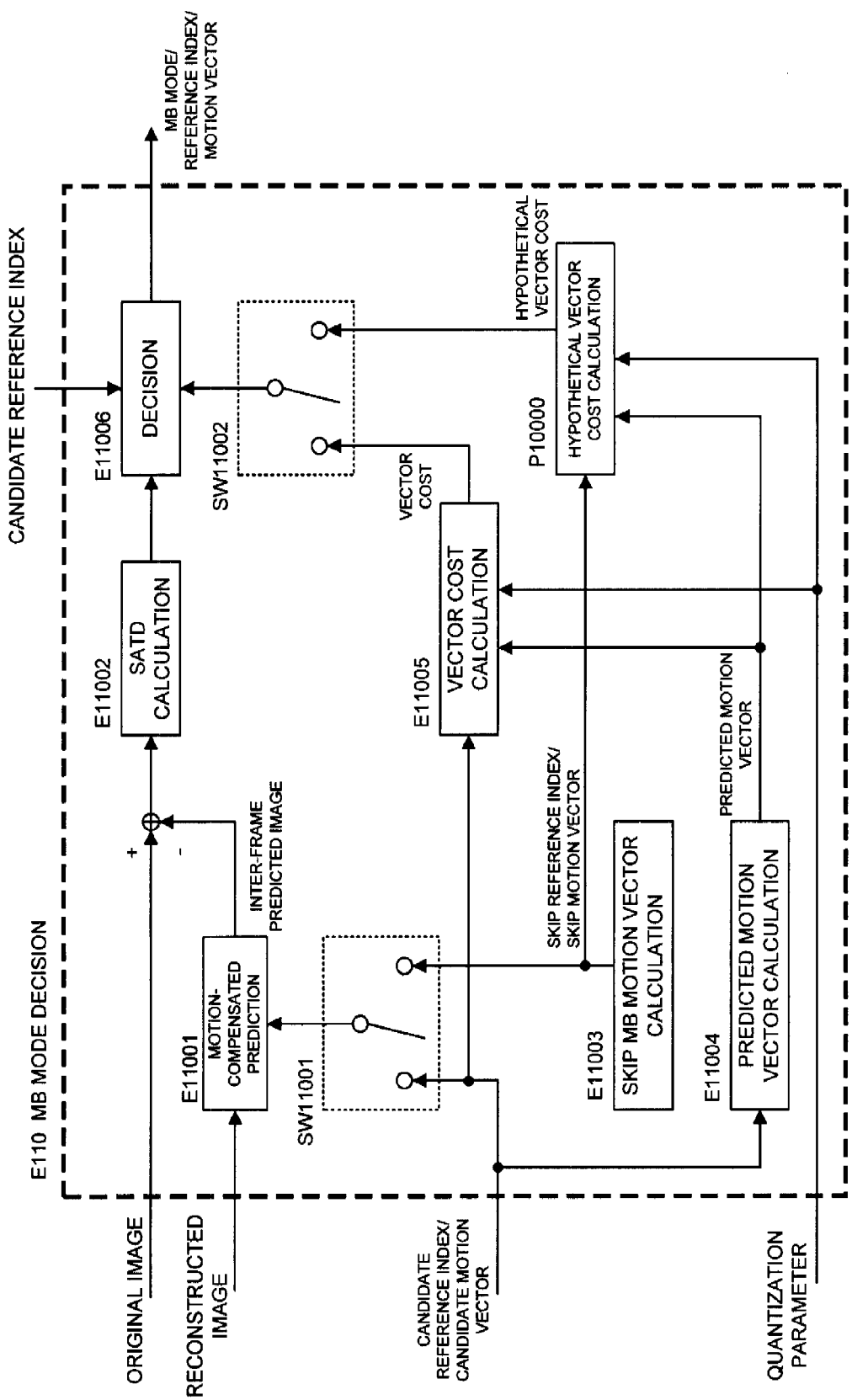
FIG. 14 is a block diagram of a third embodiment.

As compared with the first embodiment, a third embodiment includes means for deciding whether the skip MB mode is valid by comparing the reference frame (reference index ref_idx16) calculated by the motion vector calculating apparatus with the reference frame (skip reference index skip_ref_idx) for the skip MB mode. A configuration of an MB mode deciding apparatus of the present embodiment will be explained below with reference to FIG. 14.

As compared with the MB mode deciding apparatus of the first embodiment in FIG. 10, the apparatus of the present embodiment is different in that the candidate reference index calculated by the motion vector calculating apparatus E109 is supplied to the deciding apparatus E11006. Thus, the operation of the deciding apparatus E11006 is different from that in the first embodiment.

The following explanation will be made on the deciding apparatus E11006, which constitutes a characteristic portion of the present embodiment.

The deciding apparatus E11006, as compared with that in the first embodiment, compares the candidate reference index ref_idx16 for the inter-frame prediction mode corresponding to the 16×16 block size supplied by the external motion vector calculating apparatus E109 with the reference index (skip_ref_idx=0) for the skip MB mode, and makes control to prevent the skip MB mode from becoming the encoding mode mb_mode for the MB when ref_idx16 is different from skip_ref_idx. Thus, the P skip MB mode causing a subjectively undesirable motion vector is prevented with higher accuracy from being inappropriately selected.

The explanation of the deciding apparatus E11006 that constitutes a characteristic portion of this embodiment has now been completed.

Figure 15:
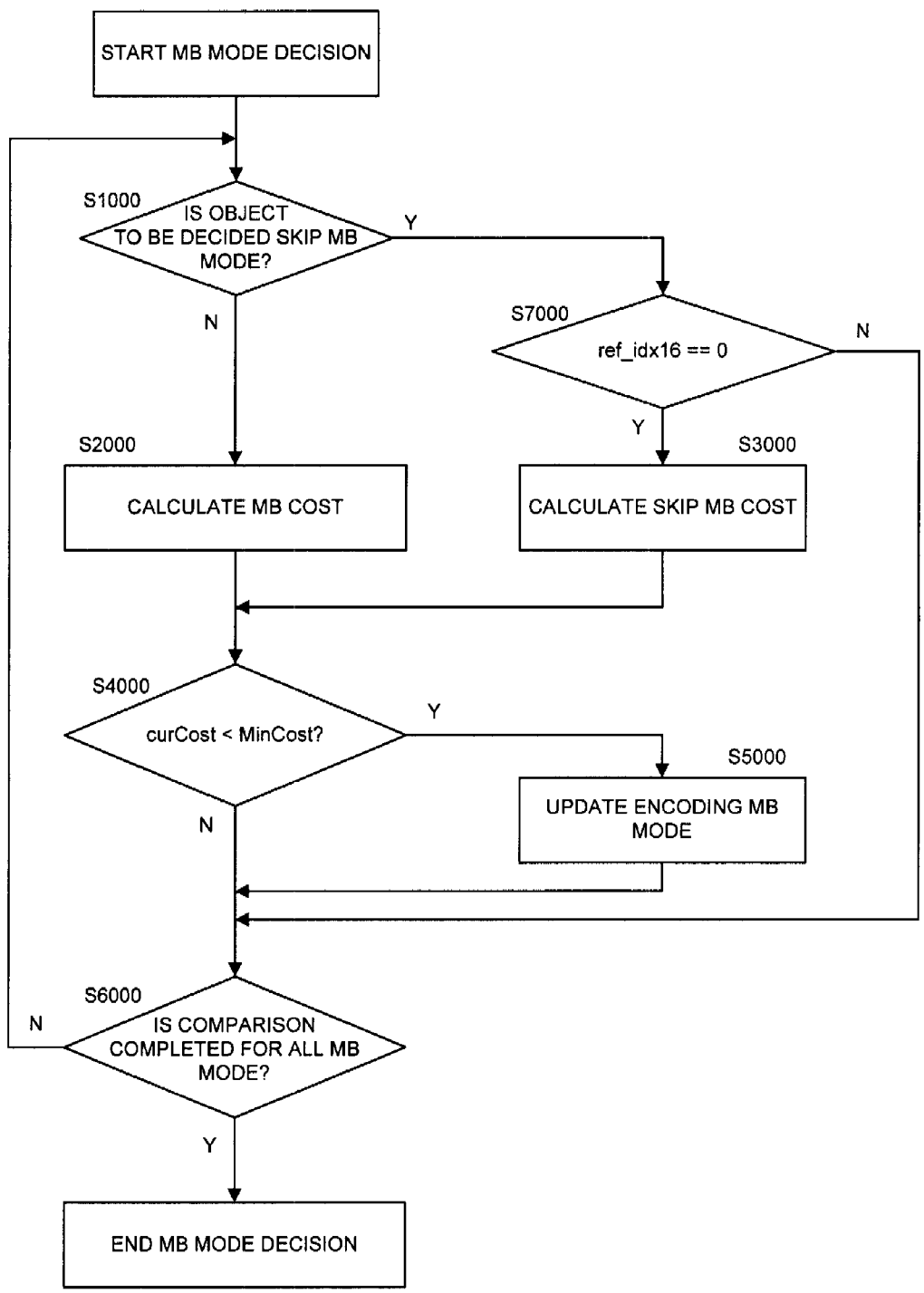
FIG. 15 is a flow chart in the third embodiment.

Subsequently, an operation of the MB mode deciding apparatus in accordance with this embodiment will be explained with reference to the flow chart in FIG. 15. As compared with the flow chart in FIG. 11, this flow chart is different in that Step S7000 is additionally introduced.

At the start of MB mode decision, an initial value (a sufficiently large value) is first set into a minimum cost MinCost.

At Step S1000, a decision is made as to whether an object to be decided is the skip MB. If it is not the skip MB, the process goes to Step S2000; otherwise, to Step S7000.

At Step S2000, the reference index ref_idx and motion vector mv corresponding to the MB mode to be decided are employed to calculate an MB mode cost mb_cost according to EQ. (8), which is set into a variable curCost, and the process then goes to Step S4000.

At Step S7000, the candidate reference index ref_idx16 for the inter-frame prediction mode corresponding to the 16×16 block size supplied by the external motion vector calculating apparatus E109 is compared with the reference index (skip_ref_idx=0) for the skip MB mode to check whether they are equal to each other. If they are equal, the process goes to Step S3000; otherwise, to Step S6000.

At Step S3000, the reference index ref_idx and motion vector mv corresponding to the skip MB mode are employed to calculate a skip MB mode cost smb_cost according to EQ. (12), which is set into a variable curCost, and the process then goes to Step S4000.

At Step S4000, a decision is made as to whether the variable curCost is smaller than the minimum cost MinCost. If it is smaller, the process goes to Step S5000; otherwise, to Step S6000.

At Step S5000, the minimum cost MinCost is updated using the variable curCost, and mb_mode for the current MB mode to be decided, its corresponding reference index ref_idx and motion vector mv are stored (an encoding MB mode to be selected is updated). Then, the process goes to Step S6000.

At Step S6000, a decision is made as to whether comparison is completed for all MB modes. If comparison is not completed for all MB modes, mb_mode for a next MB mode to be decided is set and the process goes back to Step S1000. If comparison is completed for all MB modes, the MB mode decision is terminated.

Upon termination of the MB mode decision, the MB mode deciding apparatus outputs the currently held mb_mode, reference index ref_idx, and motion vector mv as parameters for encoding the current MB to the external.

The explanation of the operation of the MB mode deciding apparatus according to this embodiment has now been completed.

Figure 16:
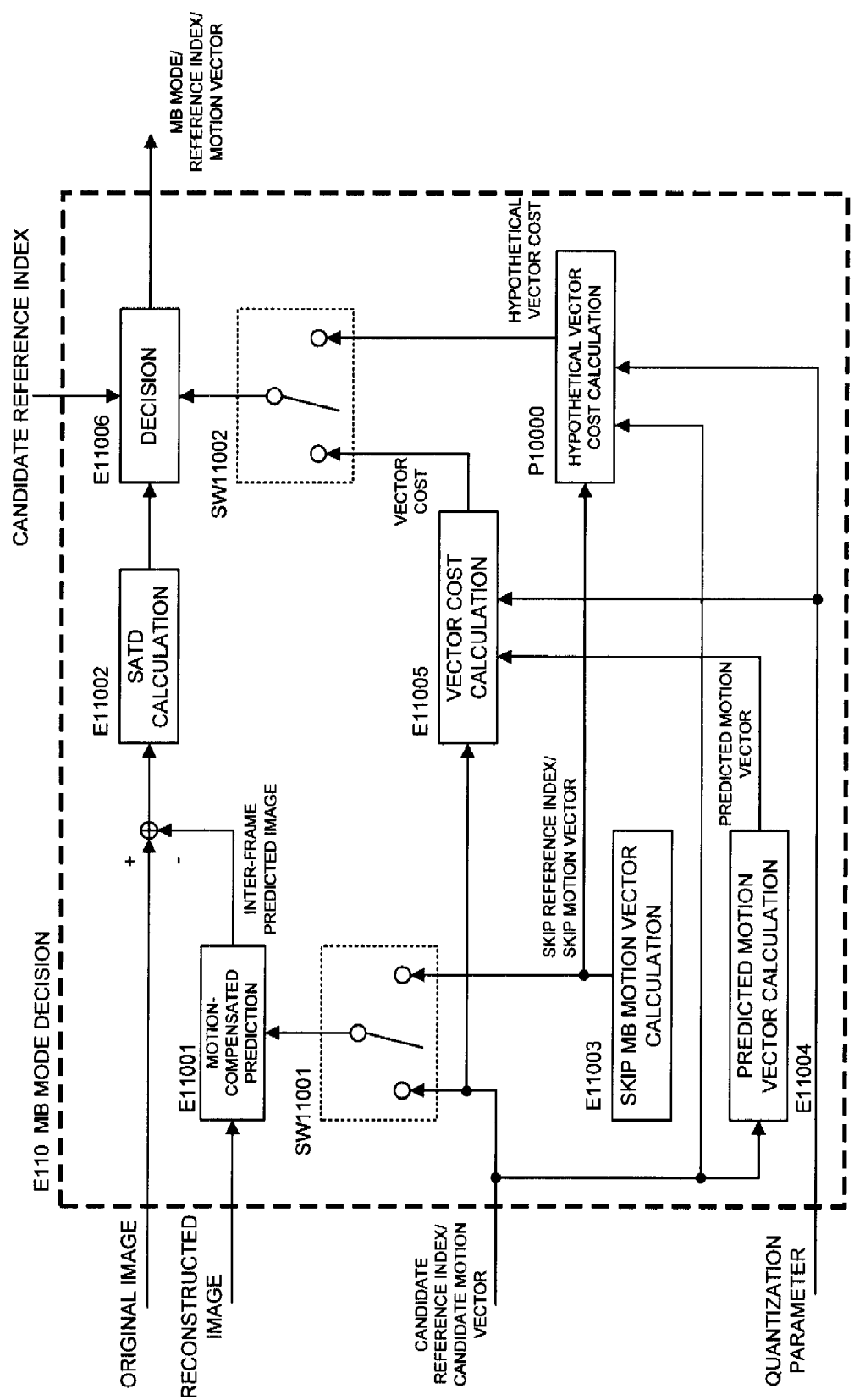
FIG. 16 is a block diagram of the third embodiment.

Note that it is possible to employ this embodiment in the second embodiment. In that case, the configuration of the MB mode deciding apparatus is that as shown in FIG. 16. It will be easily recognized that this embodiment may be suitably applied to validity decision of a direct mode for B-slices (see Non-patent Document 1: ISO/IEC 14496-10 Advanced Video Coding for further information).

Fourth Embodiment

As compared with the inventive scheme of the first embodiment, a fourth embodiment includes means for deciding whether the skip MB mode is valid by deciding whether the current MB lies at the boundary of pictures or of slices referring to the MB address.

Figure 17:
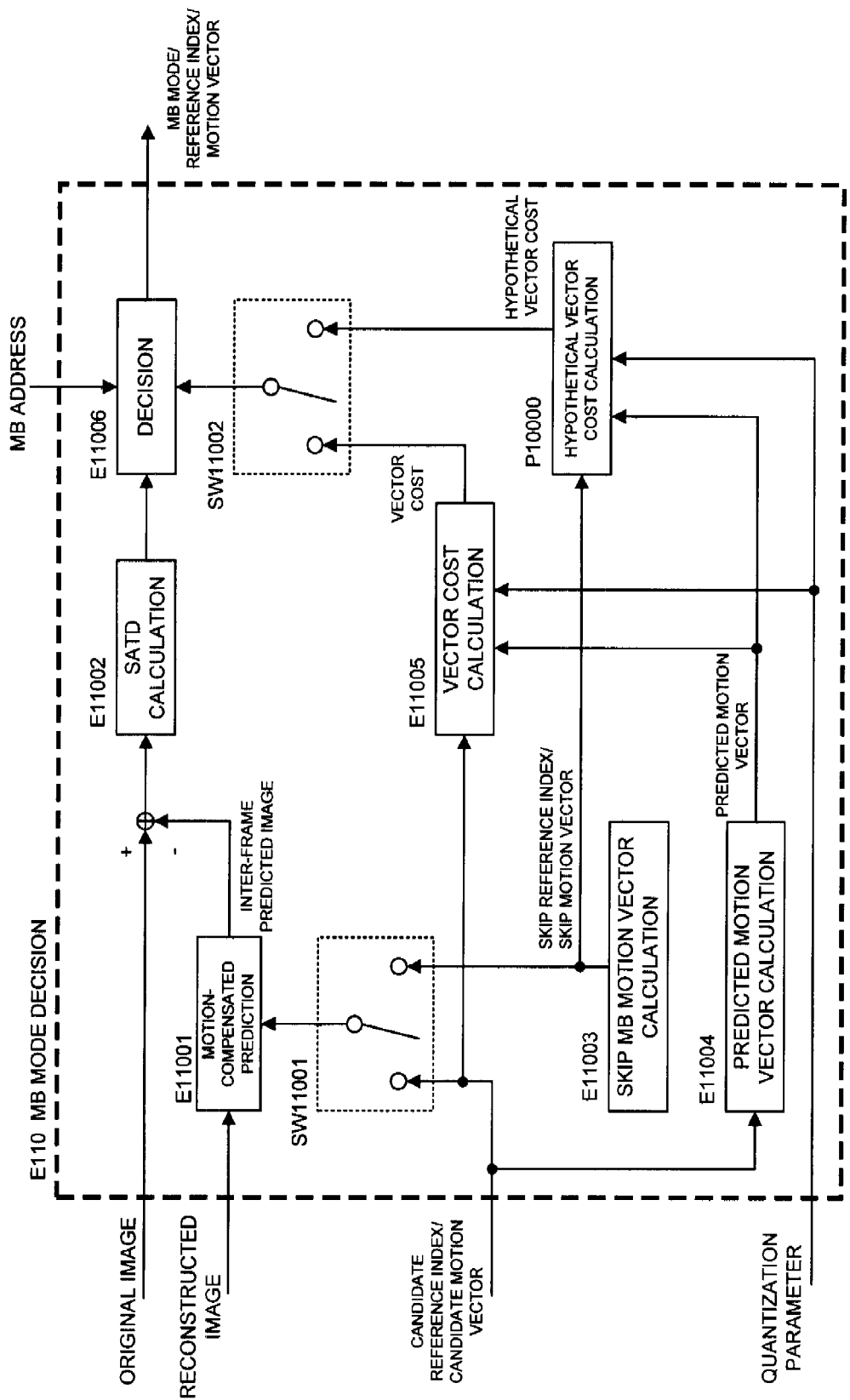
FIG. 17 is a block diagram of a fourth embodiment.

A configuration of an MB mode deciding apparatus of the present embodiment will be explained below with reference to FIG. 17.

As compared with the MB mode deciding apparatus of the first embodiment in FIG. 10, the apparatus of the present embodiment is different in that the MB address is supplied to the deciding apparatus E11006. Thus, the operation of the deciding apparatus E11006 is different from that in the first embodiment.

The following explanation will be made on the deciding apparatus E11006, which constitutes a characteristic portion of this embodiment.

The deciding apparatus E11006, as compared with that in the first embodiment, decides whether the current MB lies at the boundary of pictures or of slices referring to the supplied MB address, and if the current MB lies at the boundary of pictures or of slices, it makes control to prevent the skip MB mode from becoming the encoding mode mb_mode for the MB.

In encoding according to AVC, the motion vector for the P skip MB mode is always a zero vector at the boundary of pictures or of slices, and the motion vector of an MB lying at the boundary of pictures or of slices is looked up in prediction of the motion vector in subsequent encoding; therefore, an effect of the motion vector of an MB lying at the boundary of pictures or of slices on the vector field in the picture plane is significant.

According to the present invention, by making control to prevent the P skip mode with a subjectively undesirable motion vector from being inappropriately selected at the boundary of pictures or of slices, generation of a subjectively undesirable vector field can be avoided more effectively.

The explanation of the deciding apparatus E11006 that constitutes a characteristic portion of this embodiment has now been completed.

Figure 18:
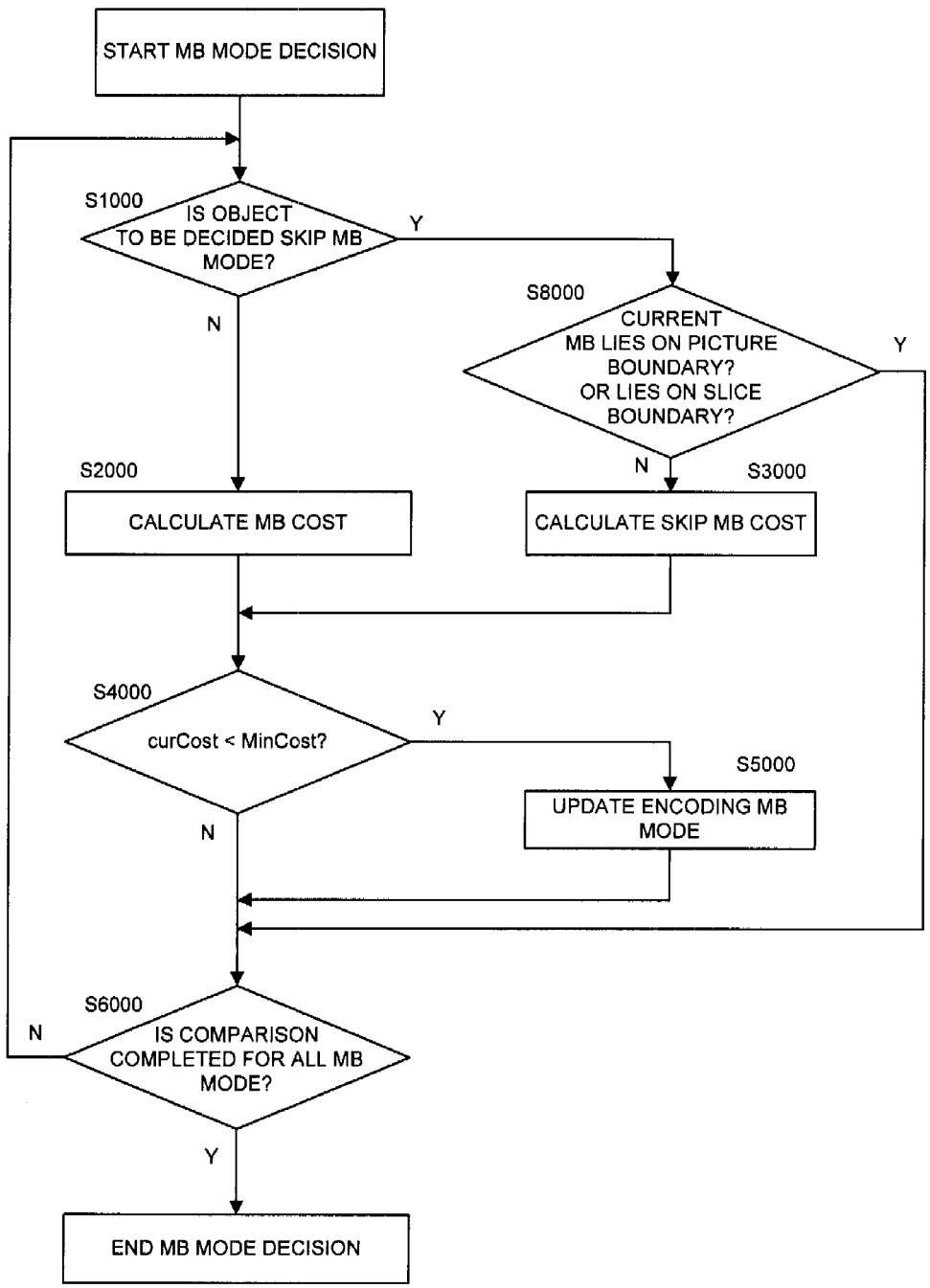
FIG. 18 is a flow chart in the fourth embodiment.

Subsequently, an operation of the MB mode deciding apparatus in accordance with this embodiment will be explained with reference to the flow chart in FIG. 18. As compared with the flow chart in FIG. 11, this flow chart is different in that Step S8000 is additionally introduced.

At the start of MB mode decision, an initial value (a sufficiently large value) is first set into a minimum cost MinCost.

At Step S1000, a decision is made as to whether an object to be decided is the skip MB. If it is not the skip MB, the process goes to Step S2000; otherwise, to Step S7000.

At Step S2000, the reference index ref_idx and motion vector mv corresponding to the MB mode to be decided are employed to calculate an MB mode cost mb_cost according to EQ. (8), which is set into a variable curCost, and the process then goes to Step S4000.

At Step S8000, referring to the supplied MB address, a decision is made as to whether the current MB lies at the boundary of pictures or of slices referring to the MB address. If the current MB lies at the boundary of pictures or of slices, the process goes to Step S6000; otherwise, to Step S3000.

At Step S3000, the reference index ref_idx and motion vector mv corresponding to the skip MB mode are employed to calculate a skip MB mode cost smb_cost according to EQ. (12), which is set into a variable curCost, and the process then goes to Step S4000.

At Step S4000, a decision is made as to whether the variable curCost is smaller than the minimum cost MinCost. If it is smaller, the process goes to Step S5000; otherwise, to Step S6000.

At Step S5000, the minimum cost MinCost is updated using the variable curCost, and mb_mode for the current MB mode to be decided, its corresponding reference index ref_idx and motion vector mv are stored (an encoding MB mode to be selected is updated). Then, the process goes to Step S6000.

At Step S6000, a decision is made as to whether comparison is completed for all MB modes. If comparison is not completed for all MB modes, mb_mode for a next MB mode to be decided is set and the process goes back to Step S1000. If comparison is completed for all MB modes, the MB mode decision is terminated.

Upon termination of the MB mode decision, the MB mode deciding apparatus outputs the currently held mb_mode, reference index ref_idx, and motion vector mv as parameters for encoding the current MB to the external.

The explanation of the operation of the MB mode deciding apparatus according to this embodiment has now been completed.

Figure 19:
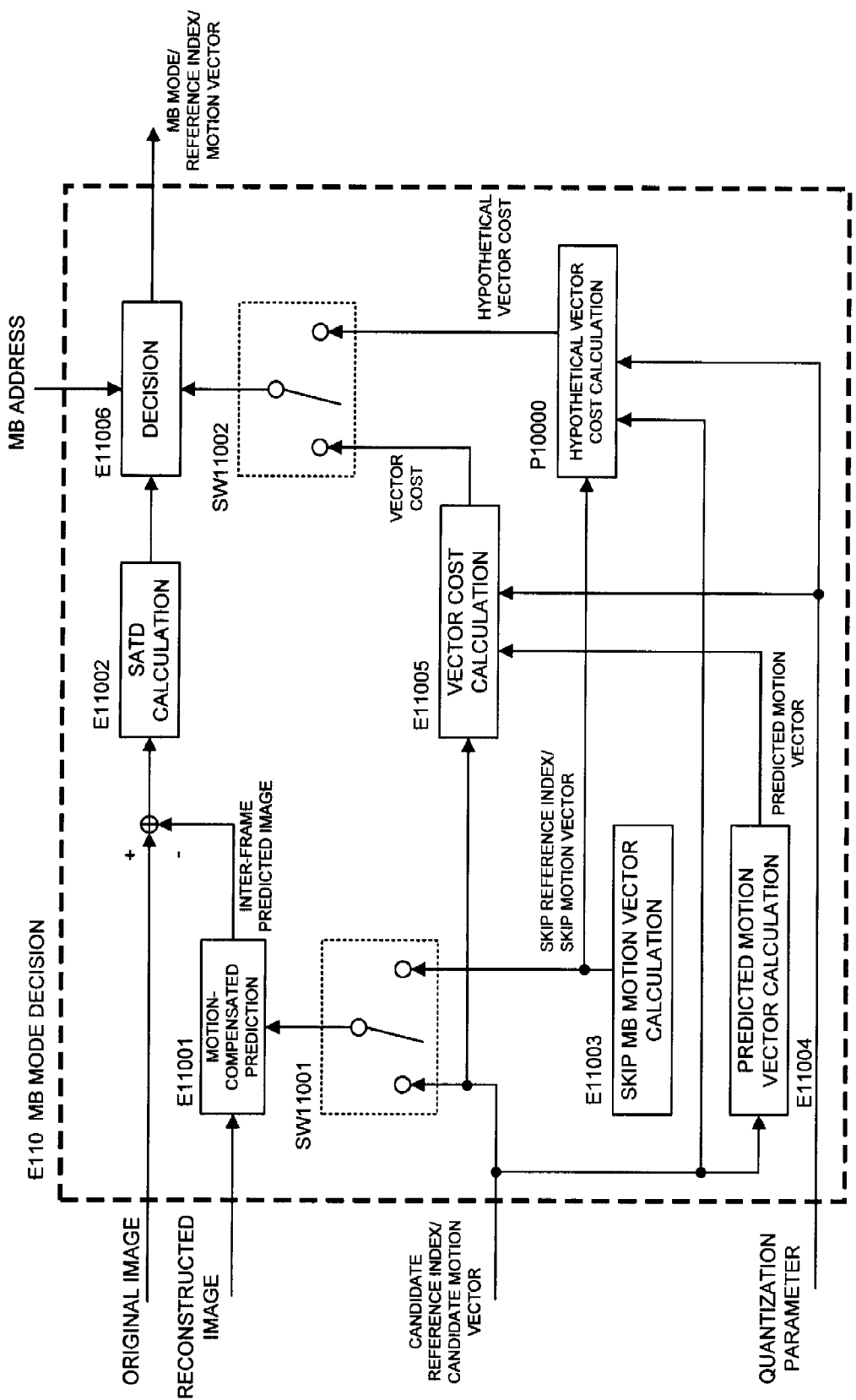
FIG. 19 is a block diagram of the fourth embodiment.

Note that it is possible to employ this embodiment in the second embodiment. In that case, the configuration of the MB mode deciding apparatus is that as shown in FIG. 19.

Fifth Embodiment

While any one of the aforementioned embodiments may be configured in hardware as apparent from the explanation above, it is possible to implement it by a computer program.

Figure 20:
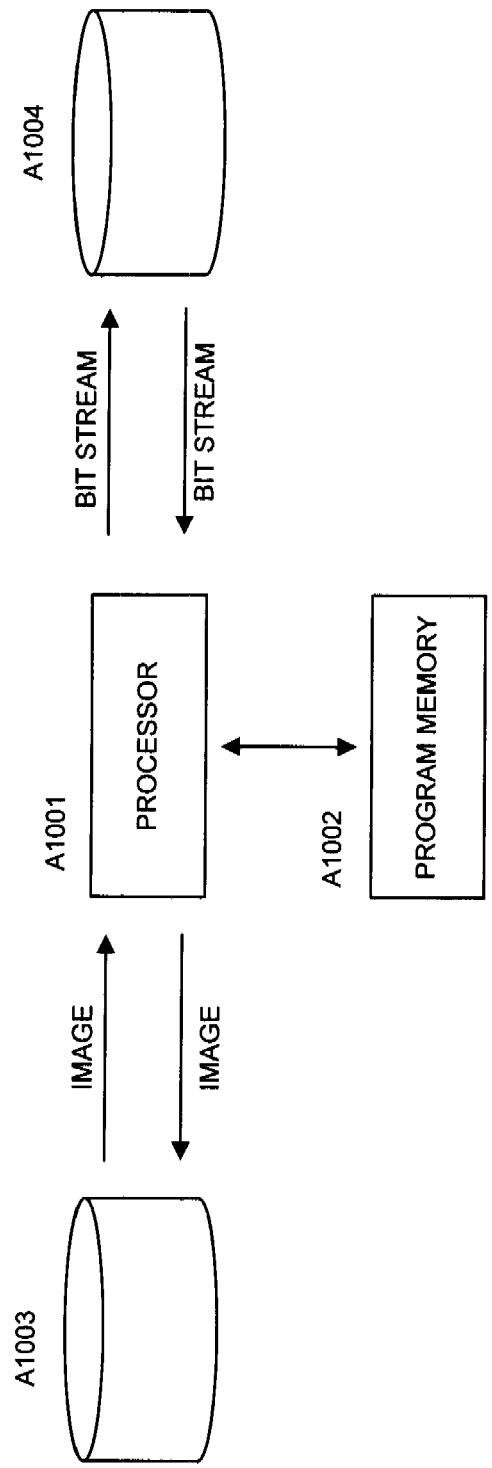
FIG. 20 shows a configuration of an information processing apparatus using the present invention.

An information processing system shown in FIG. 20 consists of a processor A1001, a program memory A1002, and storage media A1003 and A1004. The storage media A1003 and A1004 may be separate storage media, or storage regions comprised in the same storage medium. For the storage medium, a magnetic storage medium such as a hard disk may be employed.

The invention claimed is:

1. A moving picture encoding method, characterized in that the method comprises:
    an inter-frame prediction step of applying inter-frame prediction to an image on a block-by-block basis;
    a motion vector calculating step of calculating a reference frame and a motion vector for use in inter-frame prediction of said block;
    a predicted motion vector calculating step of calculating a predicted motion vector for prediction encoding of a motion vector of said block;
    a skip mode motion vector calculating step of calculating a skip mode motion vector for a skip mode using a context of blocks spatially adjacent to said block; and
    a skip mode validity deciding step of deciding whether the skip mode is valid as an encoding mode for said block,
    wherein said skip mode validity deciding step uses a code-amount based on said skip mode motion vector for the skip mode validity decision;
    wherein said skip mode validity deciding step uses for the skip mode validity decision a value obtained by weighting, with a quantization parameter of said block, a total value of a code-amount of a differential motion vector between said skip mode motion vector and said predicted motion vector corresponding to a reference frame for said skip mode and a value obtained by subtracting a predicted image of the skip mode motion vector from an original image of said block; and
    wherein said skip mode validity deciding step uses for the skip mode validity decision a value obtained by weighting, with a quantization parameter of said block, a code-amount of a differential motion vector between said skip mode motion vector and the motion vector calculated at said motion vector calculating step corresponding to a reference frame for said skip mode.

2. A moving picture encoding method according to claim 1, characterized in that said skip mode validity deciding step decides that the skip mode is invalid as an encoding mode for said block in a case that the reference frame for said skip mode is different from a reference frame calculated at said motion vector calculating step.

3. A moving picture encoding method according to claim 1, characterized in that
    said skip mode motion vector calculating step defines the skip mode motion vector as zero vector in a case that said block lies at a boundary of pictures or of slices, and
    said skip mode validity deciding step decides that the skip mode is invalid in a block lying at a boundary of pictures or of slices.

4. A moving picture encoding method according to claim 1, characterized in that said skip mode validity deciding step decides that the skip mode is invalid as an encoding mode for said block in a case that the reference frame for said skip mode is different from a reference frame calculated at said motion vector calculating step.

5. A moving picture encoding method according to claim 1, characterized in that
    said skip mode motion vector calculating step defines the skip mode motion vector as zero vector in a case that said block lies at a boundary of pictures or of slices, and
    said skip mode validity deciding step decides that the skip mode is invalid in a block lying at a boundary of pictures or of slices.

6. A moving picture encoding apparatus, characterized in that the apparatus comprises:
    inter-frame prediction means for applying inter-frame prediction to an image on a block-by-block basis;
    motion vector calculating means for calculating a reference frame and a motion vector for use in inter-frame prediction of said block;
    predicted motion vector calculating means for calculating a predicted motion vector for prediction encoding of a motion vector of said block;
    skip mode motion vector calculating means for calculating a skip mode motion vector for a skip mode using a context of blocks spatially adjacent to said block; and
    skip mode validity deciding means for deciding whether the skip mode is valid as an encoding mode for said block,
    wherein said skip mode validity deciding means uses a code-amount based on said skip mode motion vector for the skip mode validity decision;
    wherein said skip mode validity deciding means uses, for said deciding, a corrective value obtained by weighting, with a quantization parameter of said block, a code-amount of a differential motion vector between said skip mode motion vector and said predicted motion vector corresponding to a reference frame for said skip mode and a value obtained by subtracting a predicted image of the skip mode motion vector from an original image of said block; and
    wherein said corrective value is obtained by weighting, with a quantization parameter of said block, a code-amount of a differential motion vector between said skip mode motion vector and the motion vector calculated by said motion vector calculating means corresponding to a reference frame for said skip mode.

7. A moving picture encoding apparatus according to claim 6, characterized in that said skip mode validity deciding means decides that the skip mode is invalid as an encoding mode for said block in a case that the reference frame for said skip mode is different from a reference frame calculated by said motion vector calculating means.

8. A moving picture encoding apparatus according to claim 6, characterized in that
    said skip mode motion vector calculating means defines the skip mode motion vector as zero vector in a case that said block lies at a boundary of pictures or of slices, and
    said skip mode validity deciding means decides that the skip mode is invalid in a block lying at a boundary of pictures or of slices.

9. A moving picture encoding apparatus according to claim 6, characterized in that said skip mode validity deciding means decides that the skip mode is invalid as an encoding mode for said block in a case that the reference frame for said skip mode is different from a reference frame calculated by said motion vector calculating means.

10. A moving picture encoding apparatus according to claim 6, characterized in that
  said skip mode motion vector calculating means defines the skip mode motion vector as zero vector in a case that said block lies at a boundary of pictures or of slices, and
  said skip mode validity deciding means decides that the skip mode is invalid in a block lying at a boundary of pictures or of slices.

11. A non-transitory computer readable storage media which stores a program for a moving picture encoding apparatus, characterized in that said program causes said moving picture encoding apparatus to function as:
  inter-frame prediction means for applying inter-frame prediction to an image on a block-by-block basis;
  motion vector calculating means for calculating a reference frame and a motion vector for use in inter-frame prediction of said block;
  predicted motion vector calculating means for calculating a predicted motion vector for prediction encoding of a motion vector of said block;
  skip mode motion vector calculating means for calculating a skip mode motion vector for a skip mode using a context of blocks spatially adjacent to said block; and
  skip mode validity deciding means for deciding whether the skip mode is valid as an encoding mode for said block, and
  causes said skip mode validity deciding means to function to use a code-amount based on said skip mode motion vector for the skip mode validity decision,
  wherein the program causes said skip mode validity deciding means to function to use, for the skip mode validity decision, a value obtained by weighting, with a quantization parameter of said block, a code-amount of a differential motion vector between said skip mode motion vector and said predicted motion vector corresponding to a reference frame for said skip mode and a value obtained by subtracting a predicted image of the skip mode motion vector from an original image of said block; and
  wherein the program causes said skip mode validity deciding means to function to use, for the skip mode validity decision, a value obtained by weighting, with a quantization parameter of said block, a code-amount of a differential motion vector between said skip mode motion vector and the motion vector calculated by said motion vector calculating means corresponding to a reference frame for said skip mode.

12. A program according to claim 11, characterized in that said skip mode validity deciding means decides that the skip mode is invalid as an encoding mode for said block in a case that the reference frame for said skip mode is different from a reference frame calculated by said motion vector calculating means.

13. A program according to claim 11, characterized in that
  said skip mode motion vector calculating means defines the skip mode motion vector as zero vector in a case that said block lies at a boundary of pictures or of slices, and
  said skip mode validity deciding means decides that the skip mode is invalid in a block lying at a boundary of pictures or of slices.

14. A program according to claim 11, characterized in that said skip mode validity deciding means decides that the skip mode is invalid as an encoding mode for said block in a case that the reference frame for said skip mode is different from a reference frame calculated by said motion vector calculating means.

15. A program according to claim 11, characterized in that
  said skip mode motion vector calculating means defines the skip mode motion vector as zero vector in a case that said block lies at a boundary of pictures or of slices, and
  said skip mode validity deciding means decides that the skip mode is invalid in a block lying at a boundary of pictures or of slices.

* * * * *